US009128605B2

(12) United States Patent
Nan et al.

(10) Patent No.: US 9,128,605 B2
(45) Date of Patent: Sep. 8, 2015

(54) THUMBNAIL-IMAGE SELECTION OF APPLICATIONS

(75) Inventors: Jennifer Nan, Seattle, WA (US); Jesse Clay Satterfield, Seattle, WA (US); Patrice L. Miner, Kirkland, WA (US); Matthew I. Worley, Bellevue, WA (US); Bret P. Anderson, Kirkland, WA (US); Robert J. Jarrett, Snohomish, WA (US); Nils A. Sundelin, Bothell, WA (US); Michael A. Seibert, Redmond, WA (US); Chaitanya Dev Sareen, Seattle, WA (US); Tsz Yan Wong, Seattle, WA (US); Brian S. LeVee, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/398,157

(22) Filed: Feb. 16, 2012

(65) Prior Publication Data
US 2013/0219343 A1 Aug. 22, 2013

(51) Int. Cl.
G06F 3/00 (2006.01)
G06F 3/0488 (2013.01)
G06F 3/0481 (2013.01)
G06F 3/0486 (2013.01)

(52) U.S. Cl.
CPC .......... *G06F 3/04883* (2013.01); *G06F 3/0481* (2013.01); *G06F 3/0486* (2013.01); *G06F 3/04817* (2013.01)

(58) Field of Classification Search
CPC ...... G06F 3/0481; G06F 3/048; G06F 3/0482
USPC .......................................................... 715/838
See application file for complete search history.

(56) References Cited

U.S. PATENT DOCUMENTS

| 4,823,283 A | 4/1989 | Diehm et al. |
| 5,045,997 A | 9/1991 | Watanabe |

(Continued)

FOREIGN PATENT DOCUMENTS

| CN | 101006425 | 7/2007 |
| CN | 102197702 | 9/2011 |

(Continued)

OTHER PUBLICATIONS

Branscombe, Mary, "Using Windows 8 and the Metro Interface", Retrieved at <<http://www.tomsguide.com/us/Using-Windows-8-Metro-UI,review-1702-6.html>>, Oct. 13, 2011, pp. 5.

(Continued)

*Primary Examiner* — Kieu Vu
*Assistant Examiner* — Andrew Chung
(74) *Attorney, Agent, or Firm* — Jim Banowsky; Kate Drakos; Micky Minhas

(57) ABSTRACT

This document describes techniques and apparatuses enabling thumbnail-image selection of applications. In some embodiments, these techniques and apparatuses enable a user interface having selectable thumbnail images for applications not currently exposed on a display. The techniques and apparatuses may enable selection of this user interface through a simple gesture that is both easy-to-use and remember. Further, selection of applications not currently exposed on the display may be selected through thumbnail images representing each application's application interface as it will appear on selection.

20 Claims, 24 Drawing Sheets

(56) References Cited

U.S. PATENT DOCUMENTS

| | | |
|---|---|---|
| 5,046,001 A | 9/1991 | Barker et al. |
| 5,189,732 A | 2/1993 | Kondo |
| 5,258,748 A | 11/1993 | Jones |
| 5,297,032 A | 3/1994 | Trojan et al. |
| 5,321,750 A | 6/1994 | Nadan |
| 5,339,392 A | 8/1994 | Risberg et al. |
| 5,406,307 A | 4/1995 | Hirayama et al. |
| 5,432,932 A | 7/1995 | Chen et al. |
| 5,463,725 A | 10/1995 | Henckel et al. |
| 5,485,197 A | 1/1996 | Hoarty |
| 5,495,566 A | 2/1996 | Kwatinetz |
| 5,515,495 A | 5/1996 | Ikemoto |
| 5,574,836 A | 11/1996 | Broemmelsiek |
| 5,598,523 A | 1/1997 | Fujita |
| 5,603,053 A | 2/1997 | Gough et al. |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,675,329 A | 10/1997 | Barker et al. |
| 5,687,331 A | 11/1997 | Volk et al. |
| 5,712,995 A | 1/1998 | Cohn |
| 5,771,042 A | 6/1998 | Santos-Gomez |
| 5,793,415 A | 8/1998 | Gregory et al. |
| 5,819,284 A | 10/1998 | Farber et al. |
| 5,859,636 A | 1/1999 | Pandit |
| 5,860,073 A | 1/1999 | Ferrel et al. |
| 5,905,492 A | 5/1999 | Straub et al. |
| 5,914,720 A | 6/1999 | Maples et al. |
| 5,920,316 A * | 7/1999 | Oran et al. .................... 715/779 |
| 5,940,076 A | 8/1999 | Sommers et al. |
| 5,959,621 A | 9/1999 | Nawaz et al. |
| 5,963,204 A | 10/1999 | Ikeda et al. |
| 6,008,809 A | 12/1999 | Brooks |
| 6,008,816 A | 12/1999 | Eisler |
| 6,009,519 A | 12/1999 | Jones et al. |
| 6,011,542 A | 1/2000 | Durrani et al. |
| 6,028,600 A | 2/2000 | Rosin et al. |
| 6,057,839 A | 5/2000 | Advani et al. |
| 6,064,383 A | 5/2000 | Skelly |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,166,736 A | 12/2000 | Hugh |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,266,098 B1 | 7/2001 | Cove et al. |
| 6,278,448 B1 | 8/2001 | Brown et al. |
| 6,281,940 B1 | 8/2001 | Sciammarella |
| 6,311,058 B1 | 10/2001 | Wecker et al. |
| 6,346,935 B1 | 2/2002 | Nakajima et al. |
| 6,369,837 B1 | 4/2002 | Schirmer |
| 6,385,630 B1 | 5/2002 | Ejerhed |
| 6,396,963 B2 | 5/2002 | Shaffer |
| 6,411,307 B1 | 6/2002 | Rosin et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,505,243 B1 | 1/2003 | Lortz |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,538,635 B1 | 3/2003 | Ringot |
| 6,570,597 B1 | 5/2003 | Seki et al. |
| 6,577,323 B1 | 6/2003 | Jamieson et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,636,246 B1 | 10/2003 | Gallo et al. |
| 6,662,023 B1 | 12/2003 | Helle |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,784,925 B1 | 8/2004 | Tomat et al. |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,445 B2 | 7/2005 | Bae |
| 6,938,101 B2 | 8/2005 | Hayes et al. |
| 6,961,731 B2 | 11/2005 | Holbrook |
| 6,970,749 B1 * | 11/2005 | Chinn et al. .................... 700/12 |
| 6,972,776 B2 | 12/2005 | Davis et al. |
| 6,975,306 B2 | 12/2005 | Hinckley |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,124,373 B1 | 10/2006 | Patil |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,251,782 B1 | 7/2007 | Albers |
| 7,262,775 B2 | 8/2007 | Calkins et al. |
| 7,263,668 B1 | 8/2007 | Lentz |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,296,242 B2 | 11/2007 | Agata et al. |
| 7,304,638 B2 | 12/2007 | Murphy |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |

(56) References Cited

U.S. PATENT DOCUMENTS

| | | |
|---|---|---|
| 7,403,191 B2 | 7/2008 | Sinclair |
| 7,408,538 B2 | 8/2008 | Hinckley et al. |
| 7,412,663 B2 | 8/2008 | Lindsay et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,689,916 B1 | 3/2010 | Goel et al. |
| 7,702,683 B1 | 4/2010 | Kirshenbaum |
| 7,739,622 B2 | 6/2010 | DeLine et al. |
| 7,755,674 B2 | 7/2010 | Kaminaga |
| 7,834,861 B2 | 11/2010 | Lee |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,898,529 B2 | 3/2011 | Fitzmaurice et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,086,275 B2 | 12/2011 | Wykes |
| 8,091,045 B2 | 1/2012 | Christie et al. |
| 8,108,781 B2 | 1/2012 | Laansoo et al. |
| 8,131,808 B2 | 3/2012 | Aoki et al. |
| 8,134,727 B1 | 3/2012 | Shmunis et al. |
| 8,150,924 B2 | 4/2012 | Buchheit et al. |
| 8,175,653 B2 | 5/2012 | Smuga |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,245,156 B2 | 8/2012 | Mouilleseaux et al. |
| 8,250,494 B2 | 8/2012 | Butcher |
| 8,255,473 B2 | 8/2012 | Eren et al. |
| 8,255,812 B1 | 8/2012 | Parparita et al. |
| 8,269,736 B2 | 9/2012 | Wilairat |
| 8,334,871 B2 | 12/2012 | Hamilton et al. |
| 8,429,565 B2 | 4/2013 | Agarawala et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway et al. |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0097264 A1 | 7/2002 | Dutta et al. |
| 2002/0105553 A1 | 8/2002 | Segre |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihata |
| 2003/0020671 A1 | 1/2003 | Santoro et al. |
| 2003/0040300 A1 | 2/2003 | Bodic et al. |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0107604 A1 | 6/2003 | Ording |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2004/0066414 A1 | 4/2004 | Czerwinski et al. |
| 2004/0066418 A1 | 4/2004 | Tosey |
| 2004/0068543 A1 | 4/2004 | Seifert |
| 2004/0078299 A1 | 4/2004 | Down-Logan et al. |
| 2004/0111673 A1 | 6/2004 | Bowman et al. |
| 2004/0185883 A1 | 9/2004 | Rukman |
| 2004/0212586 A1 | 10/2004 | Denny, III |
| 2004/0212617 A1 | 10/2004 | Fitzmaurice et al. |
| 2004/0217954 A1 | 11/2004 | O'Gorman et al. |
| 2004/0237048 A1 | 11/2004 | Tojo et al. |
| 2004/0250217 A1 | 12/2004 | Tojo et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0091612 A1 | 4/2005 | Stabb et al. |
| 2005/0108655 A1 | 5/2005 | Andrea et al. |
| 2005/0114778 A1 | 5/2005 | Branson et al. |
| 2005/0114788 A1 | 5/2005 | Fabritius |
| 2005/0125739 A1 | 6/2005 | Thompson et al. |
| 2005/0136953 A1 | 6/2005 | Jo |
| 2005/0143138 A1 | 6/2005 | Lee et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0010394 A1 | 1/2006 | Chaudhri et al. |
| 2006/0015562 A1 | 1/2006 | Kilian-Kehr et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0055670 A1 | 3/2006 | Castrucci |
| 2006/0059430 A1 | 3/2006 | Bells |
| 2006/0070005 A1 | 3/2006 | Gilbert et al. |

(56) References Cited

U.S. PATENT DOCUMENTS

| | | |
|---|---|---|
| 2006/0074735 A1 | 4/2006 | Shukla et al. |
| 2006/0074771 A1 | 4/2006 | Kim |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0114239 A1 | 6/2006 | Nakajima |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0156247 A1 | 7/2006 | McCormack et al. |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0050724 A1 | 3/2007 | Lee et al. |
| 2007/0054679 A1 | 3/2007 | Cho et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0067798 A1 | 3/2007 | Wroblewski |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083821 A1 | 4/2007 | Garbow et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0136677 A1 | 6/2007 | Agarwal |
| 2007/0157089 A1 | 7/2007 | Van Os et al. |
| 2007/0171192 A1 | 7/2007 | Seo et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0214454 A1 | 9/2007 | Edwards et al. |
| 2007/0216651 A1 | 9/2007 | Patel |
| 2007/0216661 A1 | 9/2007 | Chen et al. |
| 2007/0225022 A1 | 9/2007 | Satake |
| 2007/0233654 A1 | 10/2007 | Karlson |
| 2007/0236468 A1 | 10/2007 | Tuli |
| 2007/0238487 A1 | 10/2007 | Kuhl et al. |
| 2007/0238488 A1 | 10/2007 | Scott |
| 2007/0247435 A1 | 10/2007 | Benko et al. |
| 2007/0250583 A1 | 10/2007 | Hardy |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0266342 A1 | 11/2007 | Chang et al. |
| 2007/0273663 A1 | 11/2007 | Park et al. |
| 2007/0273668 A1 | 11/2007 | Park et al. |
| 2007/0280457 A1 | 12/2007 | Aberethy et al. |
| 2007/0281747 A1 | 12/2007 | Pletikosa |
| 2007/0291007 A1 | 12/2007 | Forlines et al. |
| 2008/0005668 A1 | 1/2008 | Mavinkurve |
| 2008/0028294 A1 | 1/2008 | Sell et al. |
| 2008/0032681 A1 | 2/2008 | West |
| 2008/0036743 A1 | 2/2008 | Westerman |
| 2008/0040692 A1 | 2/2008 | Sunday et al. |
| 2008/0048986 A1 | 2/2008 | Khoo |
| 2008/0052370 A1 | 2/2008 | Snyder |
| 2008/0052637 A1 | 2/2008 | Ben-Yoseph et al. |
| 2008/0057910 A1 | 3/2008 | Thoresson et al. |
| 2008/0057926 A1 | 3/2008 | Forstall et al. |
| 2008/0059893 A1 | 3/2008 | Byrne et al. |
| 2008/0072173 A1 | 3/2008 | Brunner et al. |
| 2008/0076472 A1 | 3/2008 | Hyatt |
| 2008/0082934 A1 | 4/2008 | Kocienda et al. |
| 2008/0085700 A1 | 4/2008 | Arora |
| 2008/0092054 A1 | 4/2008 | Bhumkar et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0111822 A1* | 5/2008 | Horowitz et al. ............ 345/530 |
| 2008/0113656 A1 | 5/2008 | Lee et al. |
| 2008/0114535 A1 | 5/2008 | Nesbitt |
| 2008/0122796 A1 | 5/2008 | Jobs |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0242277 A1 | 10/2008 | Chen et al. |
| 2008/0242362 A1 | 10/2008 | Duarte |
| 2008/0250354 A1 | 10/2008 | Park |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |

(56) References Cited

U.S. PATENT DOCUMENTS

| | | |
|---|---|---|
| 2008/0270558 A1 | 10/2008 | Ma |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0309626 A1 | 12/2008 | Westerman et al. |
| 2008/0313538 A1 | 12/2008 | Hudson |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031247 A1 | 1/2009 | Walter et al. |
| 2009/0033616 A1 | 2/2009 | Miyagi |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0083656 A1 | 3/2009 | Dokhon |
| 2009/0085851 A1 | 4/2009 | Lim |
| 2009/0085878 A1 | 4/2009 | Heubel |
| 2009/0089215 A1 | 4/2009 | Newton |
| 2009/0094562 A1* | 4/2009 | Jeong et al. ............... 715/863 |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0146962 A1 | 6/2009 | Ahonen et al. |
| 2009/0153492 A1 | 6/2009 | Popp |
| 2009/0158144 A1 | 6/2009 | Griffin |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0174679 A1 | 7/2009 | Westerman |
| 2009/0178007 A1 | 7/2009 | Matas et al. |
| 2009/0182788 A1 | 7/2009 | Chung et al. |
| 2009/0183077 A1 | 7/2009 | Hakim et al. |
| 2009/0184939 A1 | 7/2009 | Wohlstadter et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0210388 A1 | 8/2009 | Elson et al. |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0288044 A1 | 11/2009 | Matthews et al. |
| 2009/0292989 A1 | 11/2009 | Matthews et al. |
| 2009/0293007 A1* | 11/2009 | Duarte et al. ............... 715/767 |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0322760 A1 | 12/2009 | Kwiatkowski et al. |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0058248 A1 | 3/2010 | Park |
| 2010/0066698 A1 | 3/2010 | Seo |
| 2010/0070931 A1 | 3/2010 | Nichols |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079413 A1 | 4/2010 | Kawashima et al. |
| 2010/0081475 A1 | 4/2010 | Chiang et al. |
| 2010/0087169 A1 | 4/2010 | Lin |
| 2010/0087173 A1 | 4/2010 | Lin |
| 2010/0088635 A1 | 4/2010 | Louch |
| 2010/0100839 A1 | 4/2010 | Tseng et al. |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106607 A1 | 4/2010 | Riddiford et al. |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0138767 A1 | 6/2010 | Wang et al. |
| 2010/0138773 A1* | 6/2010 | Schechter et al. ............ 715/779 |
| 2010/0145675 A1 | 6/2010 | Lloyd et al. |
| 2010/0146437 A1 | 6/2010 | Woodcock et al. |
| 2010/0157157 A1 | 6/2010 | Yi |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0175018 A1 | 7/2010 | Petschnigg et al. |
| 2010/0175029 A1 | 7/2010 | Williams |
| 2010/0180233 A1 | 7/2010 | Kruzeniski et al. |
| 2010/0192102 A1 | 7/2010 | Chmielewski et al. |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302278 A1 | 12/2010 | Shaffer et al. |
| 2010/0302712 A1 | 12/2010 | Wilairat |
| 2010/0309148 A1 | 12/2010 | Fleizach et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0328431 A1 | 12/2010 | Kim et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |

(56) References Cited

U.S. PATENT DOCUMENTS

| | | |
|---|---|---|
| 2011/0029904 A1 | 2/2011 | Smith et al. |
| 2011/0029934 A1 | 2/2011 | Locker et al. |
| 2011/0043527 A1 | 2/2011 | Ording et al. |
| 2011/0055773 A1 | 3/2011 | Agarawala et al. |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087739 A1 | 4/2011 | Lin et al. |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0107272 A1* | 5/2011 | Aguilar ............ 715/853 |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0138313 A1* | 6/2011 | Decker et al. ............ 715/777 |
| 2011/0154235 A1 | 6/2011 | Min et al. |
| 2011/0157027 A1 | 6/2011 | Rissa |
| 2011/0158558 A1* | 6/2011 | Zhao et al. ............ 382/305 |
| 2011/0161845 A1 | 6/2011 | Stallings et al. |
| 2011/0163968 A1 | 7/2011 | Hogan |
| 2011/0163971 A1 | 7/2011 | Wagner et al. |
| 2011/0167341 A1 | 7/2011 | Cranfill et al. |
| 2011/0173556 A1 | 7/2011 | Czerwinski et al. |
| 2011/0173568 A1 | 7/2011 | Royal, Jr. et al. |
| 2011/0175930 A1 | 7/2011 | Hwang et al. |
| 2011/0179387 A1* | 7/2011 | Shaffer et al. ............ 715/835 |
| 2011/0185318 A1 | 7/2011 | Hinckley et al. |
| 2011/0191675 A1 | 8/2011 | Kauranen |
| 2011/0209099 A1 | 8/2011 | Hinckley et al. |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1* | 10/2011 | Chaudhri ............ 715/836 |
| 2011/0252381 A1 | 10/2011 | Chaudhri |
| 2011/0279461 A1 | 11/2011 | Hamilton et al. |
| 2011/0320978 A1 | 12/2011 | Horodezky et al. |
| 2012/0005584 A1 | 1/2012 | Seago et al. |
| 2012/0005602 A1 | 1/2012 | Anttila et al. |
| 2012/0026173 A1 | 2/2012 | Gabbert et al. |
| 2012/0028687 A1 | 2/2012 | Wykes |
| 2012/0050185 A1 | 3/2012 | Davydov et al. |
| 2012/0050332 A1 | 3/2012 | Nikara et al. |
| 2012/0079414 A1 | 3/2012 | Eischeid et al. |
| 2012/0102433 A1 | 4/2012 | Falkenburg |
| 2012/0131519 A1* | 5/2012 | Jitkoff ............ 715/863 |
| 2012/0151397 A1 | 6/2012 | Oberstein et al. |
| 2012/0159395 A1 | 6/2012 | Deutsch et al. |
| 2012/0159402 A1 | 6/2012 | Nurmi et al. |
| 2012/0161791 A1 | 6/2012 | Shaw |
| 2012/0167008 A1 | 6/2012 | Zaman |
| 2012/0167011 A1 | 6/2012 | Zaman |
| 2012/0174005 A1 | 7/2012 | Deutsch |
| 2012/0174029 A1 | 7/2012 | Bastide et al. |
| 2012/0179992 A1 | 7/2012 | Smuga |
| 2012/0180001 A1* | 7/2012 | Griffin et al. ............ 715/863 |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0233571 A1 | 9/2012 | Wever et al. |
| 2012/0244841 A1 | 9/2012 | Teng |
| 2012/0246596 A1 | 9/2012 | Ording et al. |
| 2012/0254780 A1 | 10/2012 | Mouton et al. |
| 2012/0254788 A1 | 10/2012 | Nicholson et al. |
| 2012/0254808 A1 | 10/2012 | Gildfind |
| 2012/0265644 A1 | 10/2012 | Roa et al. |
| 2012/0272181 A1 | 10/2012 | Rogers et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311485 A1 | 12/2012 | Caliendo, Jr. et al. |
| 2012/0323992 A1 | 12/2012 | Brobst et al. |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0044141 A1 | 2/2013 | Markiewicz |
| 2013/0047105 A1 | 2/2013 | Jarrett |
| 2013/0047117 A1 | 2/2013 | Deutsch |
| 2013/0047126 A1 | 2/2013 | Sareen |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman |
| 2013/0067381 A1 | 3/2013 | Yalovsky |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard |
| 2013/0067420 A1 | 3/2013 | Pittappilly |
| 2013/0080957 A1* | 3/2013 | Sirpal et al. ............ 715/769 |
| 2013/0093757 A1 | 4/2013 | Cornell |
| 2013/0132906 A1* | 5/2013 | Siurumaa et al. ............ 715/835 |
| 2013/0179781 A1 | 7/2013 | Nan et al. |
| 2014/0298258 A1 | 10/2014 | Doan et al. |

FOREIGN PATENT DOCUMENTS

| | | |
|---|---|---|
| EP | 0583060 | 2/1994 |
| EP | 0961200 | 12/1999 |
| EP | 1337093 | 8/2003 |
| EP | 1752868 | 2/2007 |
| JP | 2004227393 | 8/2004 |
| JP | 2004357257 | 12/2004 |
| JP | 2006-301872 A | 11/2006 |
| KR | 200303655 | 2/2003 |
| KR | 20060019198 | 3/2006 |
| KR | 1020070036114 | 4/2007 |
| KR | 20070093585 | 9/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 20090002951 | 1/2009 |
| KR | 1020090041635 | 4/2009 |
| KR | 20090053143 | 5/2009 |
| KR | 20100010072 | 2/2010 |
| KR | 20100048375 | 5/2010 |
| KR | 20100056369 | 5/2010 |
| KR | 1020100056369 | 5/2010 |
| TW | 201023026 | 6/2010 |
| WO | WO-9926127 | 5/1999 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2008041318 | 4/2008 |
| WO | WO-2008084211 | 7/2008 |
| WO | WO-2009000043 | 12/2008 |
| WO | WO-2009012398 | 1/2009 |
| WO | WO-2009049331 | 4/2009 |
| WO | WO-2009054809 | 4/2009 |

(56) References Cited

FOREIGN PATENT DOCUMENTS

| WO | WO-2010048229 | 4/2010 |
|---|---|---|
| WO | WO-2010048448 | 4/2010 |
| WO | WO-2010048519 | 4/2010 |
| WO | WO-2010117643 | 10/2010 |
| WO | WO-2010135155 | 11/2010 |
| WO | WO-2011041885 | 4/2011 |
| WO | WO-2012044777 | 4/2012 |
| WO | WO-2012115964 | 8/2012 |

OTHER PUBLICATIONS

Branscombe, Mary, "Hands on: Windows 8 review" Retrieved at <<http://www.techradar.com/news/software/operating-systems/hands-on-windows-8-review-1025259>>, Sep. 13, 2011, pp. 9.
"Activity and Task Design Guidelines", Retrieved at <<http://developer.android.com/guide/practices/ui_guidelines/activity_task_design.html>>, Jun. 7, 2009, pp. 11.
"Taskbar Extensions", Retrieved at <<http://msdn.microsoft.com/en-us/library/windows/desktop/dd378460%28v=vs.85%29.aspx>>, Retrieved Date: Feb. 8, 2012, pp. 9.
"Introducing Android 4.0", Retrieved at <<http://www.android.com/about/ice-cream-sandwich/>>, Retrieved Date: Feb. 8, 2012, pp. 6.
"International Search Report", Mailed Date: Jun. 2, 2013, Application No. PCT/US2013/026001, Filed date: Feb. 13, 2013, pp. 11.
"PCT Search Report and Written Opinion", International Application No. PCT/US2011/055521, (May 15, 2012), 9 pages.
"PCT Search Report and Written Opinion", International Application No. PCT/US2011/055522, (May 15, 2012), 9 pages.
"PCT Search Report and Written Opinion", International Application No. PCT/US2011/055514, (May 22, 2012), 8 pages.
"Adobe Acrobat 8 Standard User Guide", Adobe Systems Incorporated,(2007), pp. 34 & 36.
"Advisory Action", U.S. Appl. No. 12/414,382, (Jan. 20, 2012), 3 pages.
"Advisory Action", U.S. Appl. No. 12/433,605, (Apr. 5, 2012), 3 pages.
"Alltel Adds Dedicated Search Key to Phones", Retrieved from: <http://www.phonescoop.com/news/item.php?n=2159> on Nov. 26, 2008., (Apr. 12, 2007) 2 Pages.
"Android 2.3 Users Guide", AUG-2.3-103, Android mobile technology platform 2.3,(Dec. 13, 2010), 380 pages.
"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007), 11 pages.
"Application User Model IDs", Retrieved from: <http://msdn.microsoft.com/en-us/library/dd378459(VS.85).aspx> on Sep. 28, 2010, (2010), 6 pages.
"Ask Web Hosting", Retrieved from: <http://www.askwebhosting.com/story/18501/HTC_FUZE_ATandampT_Fuses_Fun_and_Function_With_the One-Touch_Power_of_TouchFLO_3D.html> on May 5, 2009., (Nov. 11, 2008), 3 pages.
"Basics of Your Device: Get Familiar with the Home Scree", *Nokia USA—How to*, retrieved from <http;//www.nokia.ca/get-support-and-software/product-support/c6-01/how-to=> on May 11, 2013, 3 pages.
"Blackberry office tools: Qwerty Convert", Retrieved from: <http://blackberrysoftwarelist.net/blackberry/download-software/blackberry-office/qwerty_convert.aspx> on Nov. 20, 2008, 1 page.
"Calc4M", Retrieved from: <http://www.hellebo.com/Calc4M.html> on Dec. 11, 2008, (Sep. 10, 2008), 4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, (2009), 5 Pages.

"Dial a number", Retrieved from: <http://www.phonespell.org/ialhelp.html> on Nov. 20, 2008, 1 page.
"DuoSense™ Gestures", Retrieved from: <http://www.n-trig.com/Data/Uploads/Misc/DuoSenseMTG_final.pdf>, (Jul. 2008), 4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009), 2 pages.
"Email Notification for Microsoft Outlook and Outlook Express", Retrieved from: <http://www.contextmagic.com/express-notification/> on Sep. 29, 2010, (Jul. 21, 2004), 3 pages.
"Enhanced IBM Power Systems Software and PowerVM Restructuring", *IBM United States Announcement 208-082*, dated Apr. 8, 2008, available at <http://www.ibm.com/common/ssi/rep_ca/2/897/ENUS208-082/ENUS208082.PDF>, (Apr. 8, 2008), pp. 1-19.
"Exclusive: Windows Mobile 7 to Focus on Touch and Motion Gestures", Retrieved from:<http://anti-linux.blogspot.com/2008/08/exclusive-windows-7-to-focus-on.html> May 6, 2009, (Aug. 1, 2008), 14 pages.
"Extended European Search Report", European Patent Application No. 09818253.8, (Apr. 10, 2012), 7 pages.
"eXtreme Energy Conservation: Advanced Power-Saving Software for Wireless Devices", *White Paper, Freescale Semiconductor, Inc.*, Document No. XTMENRGYCNSVWP, Rev #0, available at <http://www.freescale.com/files/32bit/doc/white_paper/XTMENRGYCNSVWP.pdf>,(Feb. 2006), 15 pages.
"Final Office Action", U.S. Appl. No. 11/305,789, (Apr. 1, 2009), 10 pages.
"Final Office Action", U.S. Appl. No. 11/502,264, (Feb. 4, 2010), 15 pages.
"Final Office Action", U.S. Appl. No. 11/502,264, (Mar. 29, 2013), 16 pages.
"Final Office Action", U.S. Appl. No. 11/502,264, (Apr. 3, 2009), 9 pages.
"Final Office Action", U.S. Appl. No. 12/244,545, (Dec. 7, 2011), 16 pages.
"Final Office Action", U.S. Appl. No. 12/244,545, (Sep. 7, 2012), 23 pages.
"Final Office Action", U.S. Appl. No. 12/413,977, (Nov. 17, 2011), 16 pages.
"Final Office Action", U.S. Appl. No. 12/414,382, (Dec. 23, 2011), 7 pages.
"Final Office Action", U.S. Appl. No. 12/414,476, (Dec. 1, 2011), 20 pages.
"Final Office Action", U.S. Appl. No. 12/433,605, (Feb. 3, 2012), 11 pages.
"Final Office Action", U.S. Appl. No. 12/433,667, (Sep. 13, 2011), 17 pages.
"Final Office Action", U.S. Appl. No. 12/469,458, (Nov. 17, 2011), 15 pages.
"Final Office Action", U.S. Appl. No. 12/469,480, (Feb. 9, 2012), 17 pages.
"Final Office Action", U.S. Appl. No. 12/484,799, (Apr. 30, 2012), 13 pages.
"Final Office Action", U.S. Appl. No. 12/560,081, (Mar. 14, 2012), 16 pages.
"Final Office Action", U.S. Appl. No. 12/577,400, (Aug. 16, 2013), 25 pages.
"Final Office Action", U.S. Appl. No. 12/577,400, (Sep. 14, 2012), 26 pages.
"Final Office Action", U.S. Appl. No. 12/721,422, (Mar. 7, 2013), 10 pages.
"Final Office Action", U.S. Appl. No. 13/118,339, (Aug. 22, 2013), 21 pages.
"Final Office Action", U.S. Appl. No. 13/118,347, (Aug. 15, 2013), 25 pages.
"Final Office Action", U.S. Appl. No. 13/224,258, (Sep. 11, 2013), 37 pages.
"Final Office Action", U.S. Appl. No. 13/229,693, (Sep. 4, 2013), 23 pages.
"Final Office Action", U.S. Appl. No. 13/345,383, (Jul. 30, 2013), 27 pages.

(56) References Cited

OTHER PUBLICATIONS

"Final Office Action", U.S. Appl. No. 13/655,386, (Jun. 6, 2013), 34 pages.
"Final Office Action", U.S. Appl. No. 13/656,354, (Jun. 17, 2013), 14 pages.
"Final Office Action", U.S. Appl. No. 13/656,574, (Aug. 23, 2013), 20 pages.
"Final Office Action", U.S. Appl. No. 13/657,621, (Sep. 10, 2013), 18 pages.
"Final Office Action", U.S. Appl. No. 13/657,646, (May 6, 2013), 12 pages.
"Final Office Action", U.S. Appl. No. 13/657,789, (Jun. 21, 2013), 35 pages.
"Foreign Office Action", Chinese Application No. 201080045865.X, (Dec. 4, 2012), 10 pages.
"Foreign Office Action", Chinese Application No. 201080045865.X, (Jun. 4, 2013), 10 pages.
"Foreign Office Action", European Patent Application No. 10823883.3, (Aug. 10, 2012), 5 pages.
"Freeware.mobi", Retrieved from: <http://www.palmfreeware.mobi/download-palette.html> Nov. 6, 2008, (Oct. 9, 2001), 2 pages.
"GnomeCanvas", retrieved from: <http://library.gnome.org/devel/libgnomecanvas/unstable/GnomeCanvas.html> Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011,(May 28, 2010), 1 page.
"How do I use Categories with my Weblog?", Retrieved from: <http://tpsupport.mtcs.sixpart.com/tp/us-tp1/how_do_i_use_categories_with_my_weblog.html> on Sep. 28, 2010, (Sep. 16, 2009), 3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, (Feb. 6, 2007), 24 pages.
"HTC Shows HTC Snap with Snappy Email Feature", Retrieved from: <http://www.wirelessandmobilenews.com/smartphones/ on May 5, 2009>, (May 4, 2009), 10 Pages.
"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008), 11 pages.
"International Search Report", Application No. PCT/US2010/028553, Application Filing Date: Mar. 24, 2010,(Nov. 9, 2010), 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introduction to Windows Touch", Retrieved from: <http://download.microsoft.com/download/a/d/f/adf1347d-08dc-41a4-9084-623b1194d4b2/Win7_touch.docx> (Dec. 18, 2008), pp. 1-7.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc. ,(2009), 153 pages.
"Keyboard (5)", Retrieved from: <http://landru.uwaterloo.ca/cgi-bin/man.cgi?section=5&topic=keyboard> on Dec. 11, 2008., (Aug. 11, 1997), 8 Pages.
"Keyboard Shortcuts", Retrieved from: <http://www.pctoday.com/editorial/article.asp?article=articles%2F2005%2Ft0311%2F26t11%2F26t11.asp> on Aug.3, 2009., (Nov. 2005), 5 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 *Making a new chrome for the kiosk browser*, Kiosk Project Kiosk Browser Chrome Customization Firefox-2.x,(Aug. 16, 2007), 2 pages.

"Live Photo Gallery—Getting Started—from Camera to Panorama", Retrieved from: <http://webdotwiz.spaces.live.com/blog/cns!2782760752B93233!1729.entry> on May 5, 2009., (Sep. 2008), 7 Pages.
"Living in the Online Cloud: The T-Mobile G1 / Google Android Smartphone", Retrieved from: 21 http://www.manifest-tech.com/media_pda/t-mobile_g1_android.htm>, (Dec. 2008), 3 pages.
"Magic mouse", Retrieved from <http://www.apple.com/magicmouse/> May 10, 2011, 3 pages.
"MIDTB Tip Sheet: Book Courier", Retrieved from: <http://www.midtb.org/tipsbookcourier.htm> on Dec. 11, 2008., (Sep. 26, 2005),6 Pages.
"Mobile/UI/Designs/TouchScren/workingUI" Retrieved from: <https://wiki.mozilla.org/Mobile/UI/Designs/TouchScreen/workingUI> on Oct. 26, 2009, (2009), 30 pages.
"moGo beta v.0.4", Retrieved from: <http://forum.xda-developers.com/showthread.php?t=375196> on Sep. 27, 2010, (Mar. 7, 2008), 10 pages.
"Multi-touch", Retrieved from <http://en.wikipedia.org/wiki/Multi-touch#Microsoft_Surface> on Apr. 24, 2009, (Apr. 17, 2009), 8 pages.
"My Favorite Gadgets, System Monitor II", Retrieved from <http://www.myfavoritegadgets.info/monitors/SystemMonitorII/systemmonitorII.html> on Mar. 12, 2013, (Jun. 8, 2010), 5 pages.
"New Features in WhatsUp Gold v12.0", retrieved from <http://www.netbright.co.th/?name=product&file=readproduct&id=12> on Jun. 10, 2011, 4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006),2 Pages.
"Non-Final Office Action", U.S. Appl. No. 11/215,052, (Jun. 23, 2011), 17 pages.
"Non-Final Office Action", U.S. Appl. No. 11/305,789, (Sep. 21, 2009), 5 pages.
"Non-Final Office Action", U.S. Appl. No. 11/502,264, (Sep. 30, 2009), 15 pages.
"Non-Final Office Action", U.S. Appl. No. 11/502,264, (Sep. 14, 2012), 14 pages.
"Non-Final Office Action", U.S. Appl. No. 12/244,545, (Mar. 27, 2012), 18 pages.
"Non-Final Office Action", U.S. Appl. No. 12/244,545, (Aug. 17, 2011), 15 pages.
"Non-Final Office Action", U.S. Appl. No. 12/413,977, (Jul. 19, 2011), 17 pages.
"Non-Final Office Action", U.S. Appl. No. 12/413,977, (Jul. 20, 2012), 18 pages.
"Non-Final Office Action", U.S. Appl. No. 12/414,382, (Jul. 26, 2011), 9 pages.
"Non-Final Office Action", U.S. Appl. No. 12/414,434, (Jan. 17, 2012), 7 pages.
"Non-Final Office Action", U.S. Appl. No. 12/414,434, (May 31, 2012), 7 pages.
"Non-Final Office Action", U.S. Appl. No. 12/414,434, (Aug. 2, 2011), 6 pages.
"Non-Final Office Action", U.S. Appl. No. 12/414,455, (Aug. 29, 2011), 8 pages.
"Non-Final Office Action", U.S. Appl. No. 12/414,458, (Jul. 6, 2011), 8 pages.
"Non-Final Office Action", U.S. Appl. No. 12/414,476, (Nov. 9, 2012), 22 pages.
"Non-Final Office Action", U.S. Appl. No. 12/414,476, (Aug. 3, 2011), 21 pages.
"Non-Final Office Action", U.S. Appl. No. 12/433,605, (Jun. 24, 2011), 10 pages.
"Non-Final Office Action", U.S. Appl. No. 12/433,667, (Jun. 7, 2011), 15 pages.
"Non-Final Office Action", U.S. Appl. No. 12/433,667, (Feb. 3, 2012), 16 pages.
"Non-Final Office Action", U.S. Appl. No. 12/469,419, (Nov. 9, 2011), 15 pages.
"Non-Final Office Action", U.S. Appl. No. 12/469,419, (May 23, 2012), 13 pages.

(56) References Cited

OTHER PUBLICATIONS

"Non-Final Office Action", U.S. Appl. No. 12/469,458, (Jul. 1, 2011), 15 pages.
"Non-Final Office Action", U.S. Appl. No. 12/469,458, (Sep. 21, 2012), 14 pages.
"Non-Final Office Action", U.S. Appl. No. 12/469,480, (Oct. 17, 2012), 16 pages.
"Non-Final Office Action", U.S. Appl. No. 12/469,480, (Sep. 22, 2011), 14 pages.
"Non-Final Office Action", U.S. Appl. No. 12/470,558, (Nov. 22, 2011), 9 pages.
"Non-Final Office Action", U.S. Appl. No. 12/480,969, (Aug. 7, 2012), 15 pages.
"Non-Final Office Action", U.S. Appl. No. 12/484,799, (Aug. 11, 2011), 12 pages.
"Non-Final Office Action", U.S. Appl. No. 12/484,799, (Aug. 7, 2012), 13 pages.
"Non-Final Office Action", U.S. Appl. No. 12/484,845, (Dec. 7, 2011), 16 pages.
"Non-Final Office Action", U.S. Appl. No. 12/560,081, (Dec. 7, 2011), 16 pages.
"Non-Final Office Action", U.S. Appl. No. 12/577,400, (Apr. 15, 2013), 25 pages.
"Non-Final Office Action", U.S. Appl. No. 12/577,400, (Oct. 8, 2013), 24 pages.
"Non-Final Office Action", U.S. Appl. No. 12/577,400, (Apr. 11, 2012), 22 pages.
"Non-Final Office Action", U.S. Appl. No. 12/721,422, (Oct. 1, 2012), 7 pages.
"Non-Final Office Action", U.S. Appl. No. 12/972,967, (Jan. 30, 2013), 19 pages.
"Non-Final Office Action", U.S. Appl. No. 12/977,584, (Dec. 7, 2012), 8 pages.
"Non-Final Office Action", U.S. Appl. No. 12/978,184, (Jan. 23, 2013), 7 pages.
"Non-Final Office Action", U.S. Appl. No. 12/983,106, (Nov. 9, 2012), 17 pages.
"Non-Final Office Action", U.S. Appl. No. 13/073,300, (Jul. 25, 2013), 13 pages.
"Non-Final Office Action", U.S. Appl. No. 13/118,181, (Mar. 4, 2013), 22 pages.
"Non-Final Office Action", U.S. Appl. No. 13/118,204, (Feb. 28, 2013), 13 pages.
"Non-Final Office Action", U.S. Appl. No. 13/118,221, (Mar. 1, 2013), 22 pages.
"Non-Final Office Action", U.S. Appl. No. 13/118,257, (Mar. 5, 2013), 19 pages.
"Non-Final Office Action", U.S. Appl. No. 13/118,321, (Jun. 10, 2013), 32 pages.
"Non-Final Office Action", U.S. Appl. No. 13/118,333, (Jul. 5, 2013), 18 pages.
"Non-Final Office Action", U.S. Appl. No. 13/118,339, (Feb. 11, 2013), 15 pages.
"Non-Final Office Action", U.S. Appl. No. 13/118,347, (Feb. 12, 2013), 14 pages.
"Non-Final Office Action", U.S. Appl. No. 13/196,272, (Feb. 6, 2013), 10 pages.
"Non-Final Office Action", U.S. Appl. No. 13/196,272, (Sep. 3, 2013), 5 pages.
"Non-Final Office Action", U.S. Appl. No. 13/224,258, (Jan. 8, 2013), 35 pages.
"Non-Final Office Action", U.S. Appl. No. 13/229,693, (Mar. 12, 2013), 21 pages.
"Non-Final Office Action", U.S. Appl. No. 13/345,383, (Feb. 28, 2013), 25 pages.
"Non-Final Office Action", U.S. Appl. No. 13/492,495, (Dec. 19, 2012), 6 pages.
"Non-Final Office Action", U.S. Appl. No. 13/492,495, (Sep. 17, 2012), 8 pages.
"Non-Final Office Action", U.S. Appl. No. 13/655,386, (Dec. 26, 2012), 23 pages.
"Non-Final Office Action", U.S. Appl. No. 13/656,354, (Feb. 6, 2013), 10 pages.
"Non-Final Office Action", U.S. Appl. No. 13/656,574, (Jan. 31, 2013), 21 pages.
"Non-Final Office Action", U.S. Appl. No. 13/657,621, (Feb. 7, 2013), 19 pages.
"Non-Final Office Action", U.S. Appl. No. 13/657,646, (Jan. 3, 2013), 13 pages.
"Non-Final Office Action", U.S. Appl. No. 13/657,789, (Jan. 9, 2013), 38 pages.
"Non-Final Office Action", U.S. Appl. No. 13/658,694, (Apr. 26, 2013), 13 pages.
"Notice of Allowance", U.S. Appl. No. 11/215,052, (Mar. 14, 2012), 5 pages.
"Notice of Allowance", U.S. Appl. No. 11/305,789, (Nov. 23, 2009), 8 pages.
"Notice of Allowance", U.S. Appl. No. 12/414,382, (Apr. 4, 2012), 4 pages.
"Notice of Allowance", U.S. Appl. No. 12/414,434, (Aug. 17, 2012), 4 pages.
"Notice of Allowance", U.S. Appl. No. 12/414,455, (Jan. 4, 2012), 4 pages.
"Notice of Allowance", U.S. Appl. No. 12/414,458, (Oct. 31, 2011), 2 pages.
"Notice of Allowance", U.S. Appl. No. 12/414,458, (Nov. 29, 2011), 2 pages.
"Notice of Allowance", U.S. Appl. No. 12/414,458, (Aug. 10, 2011), 6 pages.
"Notice of Allowance", U.S. Appl. No. 12/470,558, (Apr. 2, 2012), 7 pages.
"Notice of Allowance", U.S. Appl. No. 12/470,558, (Aug. 23, 2012), 2 pages.
"Notice of Allowance", U.S. Appl. No. 12/484,799, (Oct. 22, 2012), 10 pages.
"Notice of Allowance", U.S. Appl. No. 12/484,845, (Mar. 16, 2012), 5 pages.
"Notice of Allowance", U.S. Appl. No. 12/721,422, (Jul. 11, 2013), 9 pages.
"Notice of Allowance", U.S. Appl. No. 12/977,584, (Jun. 19, 2013), 5 pages.
"Notice of Allowance", U.S. Appl. No. 12/978,184, (Aug. 2, 2013), 5 pages.
"Notice of Allowance", U.S. Appl. No. 13/492,495, (Apr. 26, 2013), 5 pages.
"Notice of Allowance", U.S. Appl. No. 13/655,390, (May 24, 2013), 5 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle Mobile Sales Assistant User Guide for BlackBerry", Retrieved from: <http://download.oracle.com/docs/cd/E12547_01/books/PDF/MobileSalesAsstBB.pdf.>, (Nov. 2008), 20 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., (Dec. 1999), 8 pages.
"Oracle8i Application Developers Guide—Advanced Queuing", Retrieved from: http://www.cs.umbc.edu/help/oracle8/server.815/a68005/03_adq1i.htm on May 6, 2009., (Feb. 1999), 29 Pages.
"Oracle8i Concepts Release 8.1.5", Retrieved from: http://www.cs.umbc.edu/help/oracle8/server.815/a67781/c16queue.htm on May 6, 2009., (Feb. 1999), 10 Pages.
"Palette Extender 1.0.2", Retrieved from: <http://palette-extender.en.softonic.com/symbian> on Nov. 6, 2008, (Jan. 21, 2003), 2 pages.

(56) References Cited

OTHER PUBLICATIONS

"Parallax Scrolling", Retrieved from: <http://en.wikipedia.org/wiki/Parallax_scrolling> on May 5, 2009., (May 4, 2009), 3 Pages.
"PCT Search Report and Written Opinion", Application No. PCT/US2009/061382, (May 26, 2010),10 pages.
"PCT Search Report and Written Opinion", Application No. PCT/US2009/061735, (Jun. 7, 2010),11 pages.
"PCT Search Report and Written Opinion", Application No. PCT/US2010/028699, (Oct. 4, 2010),10 pages.
"PCT Search Report and Written Opinion", Application No. PCT/US2010/028555, (Oct. 12, 2010),10 pages.
"PCT Search Report and Written Opinion", Application No. PCT/US2010/034772, (Dec. 29, 2010),12 pages.
"PCT Search Report and Written Opinion", Application No. PCT/US2010/052119, (May 2, 2011), 8 pages.
"PCT Search Report and Written Opinion", Application No. PCT/US2011/055511, (Apr. 24, 2012), 9 pages.
"PCT Search Report and Written Opinion", Application No. PCT/US2011/055520, (May 9, 2012), 8 pages.
"PCT Search Report and Written Opinion", Application No. PCT/US2011/055523, (May 10, 2012), 9 pages.
"PCT Search Report and Written Opinion", Application No. PCT/US2011/055513, (Mar. 27, 2012), 8 pages.
"PCT Search Report and Written Opinion", Application No. PCT/US2011/055512, (May 24, 2012), 8 pages.
"PCT Search Report and Written Opinion", Application No. PCT/US2011/055524, (Jun. 1, 2012), 8 pages.
"PCT Search Report and Written Opinion", Application No. PCT/US2011/065702, (Aug. 29, 2012), 8 pages.
"PCT Search Report and Written Opinion", Application No. PCT/US2011/055712, (Sep. 21, 2012), 9 pages.
"PCT Search Report and Written Opinion", Application No. PCT/US2011/055736, (Sep. 17, 2012), 8 pages.
"PCT Search Report and Written Opinion", Application No. PCT/US2011/055496, (Sep. 12, 2012), 9 pages.
"PCT Search Report and Written Opinion", Application No. PCT/US2011/067073, (Sep. 17, 2012), 8 pages.
"PCT Search Report and Written Opinion", Application No. PCT/US2011/055746, (Sep. 27, 2012), 9 pages.
"PCT Search Report and Written Opinion", Application No. PCT/US2011/055725, (Sep. 27, 2012),10 pages.
"PCT Search Report and Written Opinion", Application No. PCT/US2011/055478, (Sep. 27, 2012), 9 pages.
"PCT Search Report and Written Opinion", Application No. PCT/US2011/055493, (Sep. 26, 2012), 9 pages.
"PCT Search Report and Written Opinion", Application No. PCT/US2011/067075, Dec. 12, 2012),10 pages.
"PCT Search Report and Written Opinion", Application No. PCT/US2012/047091, (Dec. 27, 2012),15 pages.
"PCT Search Report and Written Opinion", Application No. PCT/US2010/038730, (Jan. 19, 2011), 8 pages.
"PCT SearchReport", Application Serial No. PCT/US2009/061864, (May 14, 2010), 10 pages.
"Push Notifications Overview for Windows Phone", Retrieved from: <http://msdn.microsoft.com/en-us/library/ff402558%28VS.92%29.aspx> on Sep. 30, 2010, (Sep. 3, 2010),1 page.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005), 5 Pages.
"Restriction Requirement", U.S. Appl. No. 13/658,694, (Feb. 6, 2013), 6 pages.
"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, (Dec. 15, 2008), 3 pages.
"Snap", *Windows 7 Features*, retrieved from <http://windows.microsoft.com/en-US/windows7/products/features/snap> on Sep. 23, 2011, 2 pages.
"Supplemental Notice of Allowance", U.S. Appl. No. 13/655,390, (Jul. 25, 2013), 2 pages.

"Supplementary European Search Report", European Patent Application No. 10823883.3, (Jul. 31, 2012), 3 pages.
"Switching between Tasks in Windows 8", Retrieved at <<http://www.totaltraining.com/software-training-news/index.php/microsoft-software/switching-between-tasks-in-windows-8/>>, (Dec. 26, 2012), 2 pages.
"Symbian Applications", Retrieved from: <http://symbianfullversion.blogspot.com/2008_12_01_archive.html> on May 5, 2009., (Jan. 2009), 51 Pages.
"The Map Screen", retrieved from <http://www.symbianos.org/whereamiusersguide> on Jun. 17, 2011, 3 pages.
"The Start Menu (overview)", retrieved from <http://web.archive.org/web/20101219151141/http://www.windows.microsoft.com/en-US/windows-vista/The-Start-menu-overview> on Feb. 12, 2013, (Dec. 19, 2010), 5 pages.
"ThumbJot", Retrieved form <http://thumbjot.com/wp/?page_id=8>, (2008), 2 pages.
"Top 3 Task Switchers for Androd", *TechCredo*, retrieved from <http://www.techcredo.com/android/top-3-task-switchers-for-android> on May 11, 2011,(Mar. 9, 2011), 5 pages.
"Top Android App: Swipepad", *Best Android Apps Review*, retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., (Feb. 23, 2009), 2 Pages.
"User Guide", retrieved from <http://wireframesketcher.com/help/help.html> on Jun. 17, 2011,19 pages.
"Windows 8 is Gorgeous, But Is It More Than Just a Shell? (Video)", retrieved from <http://techcrunch.com/2011/06/02/windows-8-gorgeous-shell-video/> on Jun. 20, 2011,(Jun. 2, 2011), 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, (Oct. 20, 2010), 3 pages.
"Winterface Review", Retrieved from: <http://www.mytodayscreen.com/winterface-review/> on Nov. 12, 2008, (Jul. 9, 2008), 42 pages.
"Womma", Retrieved from: <http://www.womma.org/blog/links/wom-trends/> on May 5, 2009., (2007), 70 Pages.
"Working with Multiple Windows", MSOFFICE tutorial!, retrieved from <http://www.msoffice-tutorial.com/working-with-multiple-windows.php> on Sep. 23, 2011, 3 pages.
"You've Got Mail 1.4 Build", retrieved from <http://www.fileshome.com/Shows_Animation_Plays_Sound_Automatic_N . . . > on Jan. 6, 2010 (Jun. 18, 2007), 2 pages.
"YUI 3: ScrollView [beta]", Retrieved from: <http://developer.yahoo.com/yui/3/scrollview/> on Sep. 28, 2010, 5 pages.
Bates, John "A Framework to Support Large-Scale", *University of Cambridge Computer Laboratory*, Available at <http://citeseerx.ist.psu.edu/viewdoc/download?doi=10.1.1.48.1690&rep=rep1&type=pdf>,(1996), 8 pages.
Beiber, Gerald et al., "Screen Coverage: A Pen-Interaction Problem for PDA's and Touch Screen Computers", In Proceedings of ICWMC 2007,(Mar. 2007), 6 pages.
Bjork, Staffan et al., "Redefining the Focus and Context of Focus+Context Visualizations", *In Proceedings of INFOVIS 2000*, Available at <http://www.johan.redstrom.se/papers/redefining.pdf>,(Oct. 2000), 9 pages.
Bowes, James et al., "Transparency for Item Highlighting", *Faculty of Computing Science, Dalhousie University*, Available at <http://torch.cs.dal.ca/~dearman/pubs/GI2003-bowes,dearman,perkins-paper.pdf>,(2003), 2 pages.
Bruzzese, J. P., "Using Windows 7, Managing and Monitoring Windows 7—Chapter 11", *Que Publishing*, (May 5, 2010), 33 pages.
Buring, Thorsten "User Interaction with Scatterplots on Small Screens—A Comparative Evaluation of Geometric-Semantic Zoom and Fisheye Distortion", *IEEE Transactions on Visualization and Computer Graphics, vol. 12, Issue 5*, Available at <http://citeseerx.ist.psu.edu/viewdoc/download?doi=10.1.1.134.4568&rep=rep1&type=pdf.>,(Sep. 2006), pp. 829-836.

(56) References Cited

OTHER PUBLICATIONS

Carrera, Enrique V., et al., "Conserving Disk Energy in Network Servers", available at <http://citeseerx.ist.psu.edu/viewdoc/download?doi=10.1.1.6.8301&rep=rep1&type=ps>,(Nov. 2002),15 pages.

Cawley, Christian "How to Customise Your Windows Phone 7", Retrieved from: <http://www.brighthub.com/mobile/windows-mobile-platform/articles/95213.aspx> on May 10, 2011,(Nov. 12, 2010), 3 pages.

Cawley, Christian "Windows Phone 7 Customization Tips and Tricks", retrieved from <http://www.brighthub.com/mobile/windows-mobile-platform/articles/95213.aspx> on Jun. 20, 2011,(May 16, 2011), 2 pages.

Cohen, Michael F., et al., "Wang Tiles for Image and Texture Generation", *In Proceedings of SIGGRAPH 2003*, Available <http://research.microsoft.com/en-us/um/people/cohen/WangFinal.pdf>,(2003), 8 pages.

Damien, "7 Ways to Supercharge Multitasking in Android", retrieved from <http://maketecheasier.com/7-ways-to-supercharge-multitasking-in-android/2011/01/22/>on May 11, 2011,(Jan. 22, 2011), 5 pages.

Danish, "Win7sé Brings Mac-Like Screen Corners to Windows 7 & Windows 8", retrieved from <http://technomondo.com/2011/11/13/win7se-brings-mac-like-screen-corners-to-windows-7-windows8/> on Nov. 23, 2011, (Nov. 13, 2011), 4 pages.

Davis, Ashley "A WPF Custom Control for Zooming and Panning", Retrieved from: <http://www.codeproject.com/KB/WPF/zoomandpancontrol.aspx> on Sep. 28, 2010, (Jun. 29, 201), 21 pages.

Delimarsky, Den ", Sending Tile Push Notifications on Windows Phone 7", retrieved from <http://mobile.dzone.com/articles/sending-tile-push> on May 10, 2011,(Aug. 25, 2010), 2 pages.

Denoue, Laurent et al., "WebNC: Efficient Sharing of Web Applications", *In Proceedings of WWW 2009*, Available at <http://www.fxpal.com/publications/FXPAL-PR-09-495.pdf>,(2009), 2 pages.

Dolcourt, Jessica "Webware", Retrieved from: <http://news.cnet.com/webware/?catagoryId=2010> on May 5, 2009.,13 Pages.

Dunsmuir, Dustin "Selective Semantic Zoom of a Document Collection", Available at <http://www.cs.ubc.ca/~tmm/courses/533/projrcts/dustin/propodal.pdf>,(Oct. 30, 2009), pp. 1-9.

Farrugia, Michael et al., "Cell Phone Mini Challenge: Node-Link Animation Award Animating Multivariate Dynamic Social Networks", *IEEE Symposium on Visual Analytics Science and Technology*, Columbus, OH, USA, Oct. 21-23, 2008, (Oct. 21, 2008), 2 pages.

Fisher, Bill "Cool Discussion of Push Notifications—Toast and Tile—on Windows Phone", Retrieved from: <http://www.windowsphoneexpert.com/Connection/forums/p/4153/18399.aspx> on Sep. 29, 2010, (May 3, 2010), 3 pages.

Gade, Lisa "Samsung Alias u740", Retrieved from: <http://www.mobiletechreview.com/phones/Samsung-U740.htm> on Nov. 20, 2008, (Mar. 14, 2007), 6 pages.

Gambone, Angie "How to Rearrange Applications Icons on iPhone 3GS", Retrieved at <<http://www.ehow.com/_how_5486466_rearrange-applications-icons-iphone-gs.html>>, (Jan. 27, 2011), 4 pages.

Gao, Rui "A General Logging Service for Symbian based Mobile Phones", Retrieved from: <http://www.nada.kth.se/utbilding/grukth/exjobb/rapportlistor/2007/rapporter07/gao_rui_07132.pdf.> on Jul. 17, 2008, (Feb. 2007), pp. 1-42.

Gilson, David "50 Windows 8 Tips", Retrieved at <<http:1/reviews.cnel.co.uk/soflware-and-web-apps/50-windows-8-tips-50008188/>>, (Jun. 8, 2012),15 pages.

Gralla, Preston "Windows XP Hacks, Chapter 13—Hardware Hacks", *O'Reilly Publishing*, (Feb. 23, 2005) 25 pages.

Ha, Rick et al., "SIMKEYS: An Effcient Keypad Configuration for Mobile Communications", Retrieved from: <http://ieeexplore.ieee.org/stamp/stamp.jsp?arnumber=01362557.> on Dec. 17, 2008, (Nov. 2004), 7 Pages.

Harrison, Richard "SYmbian OS C++ for Mobile Phones vol. 3", Retrieved from: <http:// www.amazon.co.uk/Symbian-OS-Mobile-Phones-Press/dp/productiondescription/0470066415>on Oct. 23, 2008, Symbian Press, (Jun. 16, 2003), 4 pages.

Hickey, Andrew R., "Google Android has Landed; T-Mobile, HTC Unveil G1", Retrieved from: <http://www.crn.com/retail/210603348> on Nov. 26, 2008., (Sep. 23, 2008), 4 pages.

Horowitz, Michael "Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, (May 23, 201), 7 pages.

Janeck, Paul et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf>,(Feb. 15, 2005), pp. 1-15.

Jawwad,"Rearrange & Get Preview of Taskbar Buttons in Windows using TaskbarEx", Retrieved at <<http://www.3 inspiredgeek.com/2008/03/11/rearrange-get-preview-of-taskbar-buttons-in-windows-using-taskbarex/>>, (Mar. 15, 2008),4 pages.

Jerk, Pinoy R., "Which Mobile OS is better, Google Android or Windows Phone 7?", Retrieved at <<http://www.pinoyrichjerk.com/which-mobile-os-is-better-google-android-or-windows-phone-7/>>, (Mar. 16, 2011), 4 pages.

Kcholi, Avi "Windows CE .NET Interprocess Communication", Retrieved from http://msdn.microsfot.com/en-us/library/ms836798.aspx on Jul. 17, 2008., (Jan. 2004), 15 Pages.

Keranen, Jaakko "OpenGL-based User Interface Toolkit for Symbian Mobile Devices", *Master of Science Thesis, Tamere University of Technology, Department of Information Technology*, (Apr. 6, 2005), 88 pages.

Kurdi, Samer "Acer GridVista: snap your windows to pre-defined sections on your screen(s)", Retrieved from <http://www.freewaredenius.com/acer-gridvista-snap-your-windows-to-pre-defined-sections-of-your-screens/> on Jun. 30, 2013, (Jan. 19, 2010), 6 pages.

Kurdi, Samer "WinSplit Revolution", Retrieved from <http://www.freewaregenius.com/winsplit-revolution/> on Jun. 30, 2013, (Aug. 22, 2007), 4 Pages.

La, Nick "Parallax Gallery", Available at <http://webdesignerwall.comtutorials/parallax-gallery/comment-page-1>,(Apr. 25, 2008),16 pages.

Livingston, et al., "Windows 95 Secrets", 1995, *IDG Books Worldwide*, 3rd Edition, (1995), pp. 121-127.

Long, Todd "Gmail Manager 0.6", Retrieved from: <https://addons.mozilla.org/en-US/firefox/addon/1320/> on Sep. 29, 2010, (Jan. 27, 2010), 4 pages.

Mann, Richard et al., "Spectrum Analysis of Motion Parallax in a 3D Cluttered Scene and Application to Egomotion", *Journal of the Optical Society of America A*, vol. 22, No. 9, Available at <http://www.cs.uwaterloo.ca/~mannr/snow/josa-mann-langer.pdf>,(Sep. 2005), pp. 1717-1731.

Mantia, Louie "Multitasking: What Does It Mean?", retrieved from <http://mantia.me/blog/multitasking/> on Sep. 23, 2011,3 pages.

Mao, Jeng "Comments of Verizon Wireless Messaging Services, LLC", Retrieved from: http://www.ntia.doc.gov/osmhome/warnings/comments/verizon.htm on May 6, 2009., (Aug. 18, 2000), 5 Pages.

Marie, Angelina "MacBook Trackpad Four Fingers Swipe Left/Right to Switch Applications", *MacBook Junkie*, retrieved from <http://www.macbookjunkie.com/macbook-trackpad-four-fingers-swipe-left-right-to-switch-applications/> on May 11, 2011,(Nov. 13, 2010), 4 pages.

Mei Tao et al., "Probabilistic Multimodality Fusion for Event Based Home Photo Clustering", Retrieved from: <http://ieeexplore.ieee.org//stamp/stamp.jsp?tp=84arnumber=04036960.>, (Dec. 26, 2006), pp. 1757-1760.

Mir, Fawad "Bring Windows 8 App to Windows 7 Desktop with Stardock Tiles", Retrieved at <<http://www.1_add_ictivetips._com/windows-tips/bring-windows-8-app-bar-to-windows-7-desktop-with-stardock-tiles/> >,, (Dec. 7, 2011), 5 pages.

Nordgren, Peder "Development of a Touch Screen Interface for Scania Interactor", *Masters Thesis in Computing Science, UMEA*

(56) References Cited

OTHER PUBLICATIONS

*University*, Available at <http://www.cs.umu.se/education/examina/ Rapporter/PederNordgren.pdf>,(Apr. 10, 2007), pp. 1-59.

Oliver, Sam "Potential iPhone Usability and Interface Improvements", Retrieved from: <http://www.appleinsider.com/articles/08/ 09/18/potential_iphone_usability_and_interface_improvements. html> on Nov. 12, 2008, AppleInsider,(Sep. 18, 2008), 4 pages.

Oryl, Michael "Review: Asus P527 Smartphone for North America", Retrieved from: <http://www.mobileburn.com/review.jsp?Id=4257> on Dec. 17, 2008., (Mar. 5, 2008), 1 Page.

Padilla, Alfredo "Palm Treo 750 Cell Phone Review—Hardware", Retrieved from: <http://www.wirelessinfo.com/content/palm-Treo-750-Cell-Phone-Review/Hardware.htm> Dec. 11, 2008., (Mar. 17, 2007), 4 Pages.

Paul, Ryan "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, (Aug. 2010), 3 pages.

Perry, Greg "Teach Yourself Windows 95 in 24 Hours", 1997, *Sams Publishing*, 2nd Edition, (1997), pp. 193-198.

Raghaven, Gopal et al., "Model Based Estimation and Verification of Mobile Device Performance", Available at http://alumni.cs.ucsb.edu/~raimisl/emsoft04_12.pdf.,(Sep. 27-29, 2004),10 Pages.

Ray, Bill "Microsoft Re-Tiles Mobile Platform for Windows 7 Era", retrieved from <http://www.theregister.co.uk/2010/02/15/windows_phone$_{13}$7_series/> on May 11, 2011,(Feb. 15, 2010), 2 pages.

Reed, Brad "Microsoft Demos Windows Mobile 6.1 at CTIA", Retrieved from: <http://www.networkworld.com/news/2008/ 040208-ctia-microsoft-windows-mobile.html> Jul. 18, 2008, (Apr. 2, 2008), 1 page.

Remond, Mickael "Mobile Marketing Solutions", Retrieved from: <http://www.mobilemarketingmagazine.co.uk/mobile_social_networking/> on May 5, 2009., (Apr. 28, 2009),16 Pages.

Rice, Stephen V., et al., "A System for Searching Sound Palettes", *Proceedings of the Eleventh Biennial Symposium on Arts and Technology,*, Available at <http://www.comparisonics.com/ FindSoundsPalettePaper.pdf>,(Feb. 2008), 6 pages.

Ritchie, Rene "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, (Jun. 14, 2010), 2 pages.

Ritscher, Walt "Using Surface APIs in your WPF application—Part 1", Retrieved from: <http://blog.wpfwonderland.com/2009/06/30/using-surface-apis-in-your-wpf-application/> on Sep. 28, 2010, (Jun. 30, 2009), 7 pages.

Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.

Sandovval, Guillermo L., "A development platform and execution environment for mobile applications", *Universidad Autónoma de Baja California, School of Chemical Engineering*, Available at <http://citeseerx.ist.psu.edu/viewdoc/download?doi=10.1.1.86. 7989&rep=rep1&type=pdf>,(2004),18 pages.

Singh, Kundan et al., "CINEMA: Columbia InterNet Extensible Multimedia Architecture", Available at <http://www1.cs.columbia.edu/~library/TR-repository/reports/reports-2002/cucs-011-02. pdf>,(Sep. 3, 2002), 83 Pages.

Smith, Greg et al., "GroupBar: The TaskBar Evolved", *Proceedings of OZCHI 2003*, Available at <http://research.microsoft.com/pubs/ 64316/ozchi2003-groupbar.pdf>,(Nov. 2003), pp. 1-10.

Stebih, Rudy "Windows 8 Mouse and Keyboard Commands", retrieved from <http://www.helpdesktv.ca/windows/windows-8-mouse-and-keyboard-commands.html> on Nov. 23, 2011, (Sep. 21, 2011), 5 pages.

Steinicke, Frank et al., "Multi-Touching 3D Data: Towards Direct Interaction in Stereoscopic Display Environments coupled with Mobile Devices", *Advanced Visual Interfaces (AVI) Workshop on Designing Multi-Touch Interaction Techniques for Coupled Public*, Available at <http://viscg.uni-muenster.de/publications/2008/ SHSK08/ppd-workshop.-pdf.>,(Jun. 15, 2008), 4 Pages.

Suror, "PocketShield—New Screenlock App for the HTC Diamond and Pro", Retrieved from: <http://wmpoweruser.com/?tag=htc-touch-diamond> on Jun. 28, 2011, (Oct. 23, 2008), 2 pages.

Terpstra, Brett "Beta Beat: Grape, a New Way to Manage Your Desktop Clutter", Retrieved from: *Beta Beat: Grape, a New Way to Manage Your Desktop Clutter* on Jun. 28, 2011, (Apr. 14, 2009), 4 pages.

Vallerio, Keith S., et al., "Energy-Efficient Graphical User Interface Design", Retrieved from: <http://www.cc.gatech.edu/classes/ AY2007/cs7470_fall/zhong-energy-efficient-user-interface.pdf>, (Jun. 10, 2004), pp. 1-13.

Vermeulen, Jan "BlackBerry PlayBook Hands-on", retrieved from <http://mybroadband.co.za/news/gadgets/20104-BlackBerry-PlayBook-hands-.html> on May 11, 2011,(May 8, 2011), 4 pages.

Viticci, Federico "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce- lion-support-and-drop-growlmail-support/> on Jul. 22, 2011,(Jul. 6, 2011),6 pages.

Vornberger, Jan "Bluetile", Retrieved from: <http://www.bluetile. org> on Sep. 29, 2010, 5 pages.

Webster, Daniel "VsNotepad: An Improved Way to Jot Down on Windows Mobile", Retrieved from <http://pocketnow.com/index. php/index.php?a=portal_detail&t=news&id=7424>, (May 19, 2009), 2 pages.

Wilson, Andrew D., "Robust Computer Vision-Based Detection of Pinching for One and Two-Handed Gesture Input", *In Proceedings of UIST 2006*, Available at <http://research.microsoft.com/en-us/um/ people/awilson/publications/wilsonuist2006/uist%202006%20taffi. pdf>,(Oct. 2006), 4 pages.

Wilson, Tracy V., "How the iPhone Works", Retrieved from: <http:// electronics.howstuffworks.com/iphone2.htm> on Apr. 24, 2009, (Jan. 2007), 9 pages.

Wobbrock, Jacob O., et al., "User-Defined Gestures for Surface Computing", *CHI 2009*, Apr. 4-9, 2009, Boston, MA, available at <http:// faculty.washington.edu/wobrock/pubs/chi-09.2.pdf>,(Apr. 4, 2009),10 pages.

Wu, Chung et al., "Achieving a Superior Ownership Experience in Manageability and Quality for Siebel CRM", available at <http:// www.oracle.com/us/products/enterprise-manager/superior-exp-for-siebel-crm-068962.pdf>,(Aug. 2008), 25 pages.

Wyatt, Paul "/Flash/the art of parallax scrolling", .net Magazine,(Aug. 1, 2007), pp. 74-76.

Yang, Seungji et al., "Semantic Photo Album Based on MPEG-4 Compatible Application Format", Retrieved from: <http:// ieeexplore.ieee.org/stamp/stamp.jsp?arnumber=04146254.>, (2007), 2 pages.

Yang, Xing-Dong et al., "Dual-Surface Input: Augmenting One-Handed Interaction with Coordinated Front and Behind-the-Screen Input", *Proceedings: MobileHCI '09*, Sep. 15-18, 2009, Bonn, Germany, retrieved from <http://www.cs.ualberta.ca/~wfb/publications/ C-2009-MobileHCI-Yang.pdf>,(Sep. 18, 2009),10 pages.

"Final Office Action", U.S. Appl. No. 12/577,400, Jan. 30, 2014, 36 pages.

"International Search Report and Written Opinion", Application No. PCT/US2013/059333, Dec. 18, 2013, 11 pages.

"KDE 4.0 Visual Guide: Desktop", Retrieved From: http://kde.org/ announcements/4.0/desktop/php, Nov. 23, 2011, 8 Pages.

"Non-Final Office Action", U.S. Appl. No. 13/345,263, Oct. 24, 2013, 19 Pages.

"Shottrack for Windows VoD Software Analysis", Retrieved From: http://www.matrixconsult.com.au/ MATRIX_Web_Files/Shot-Track_Software_Manual.pdf, Nov. 23, 2011, 47 Pages.

"What You Should Expect from the Windows 7 Beta", Retrieved From: http://www.howtogeek.com/howto/the-geek-blog/what-you-should-expect-from-the-windows-7-beta/, Nov. 23, 2011, 17 Pages.

"Window Desktop", Retrieved From: http://pjnicholson.com/ windowsdesktop.htm, Nov. 23, 2011, 4 Pages.

(56) References Cited

OTHER PUBLICATIONS

"Working with Windows", Retrieved From: http://h30097.www3hp.com/docs/base_doc/documentation/F40F html/ AQ917BTE/docu_004.htm,, Nov. 23, 2011, 14 pages.

"Non-Final Office Action", U.S. Appl. No. 13/345,383, Feb. 14, 2014, 26 pages.

"Notice on Reexamination", CN Application No. 201080045865.X, Aug. 21, 2014, 10 Pages.

"Foreign Office Action", JP Application No. 2012-534255, Aug. 15, 2014, 6 Pages.

"Non-Final Office Action", U.S. Appl. No. 13/852,786, Feb. 27, 2015, 20 pages.

\* cited by examiner

THUMBNAIL-IMAGE SELECTION OF APPLICATIONS

BACKGROUND

Conventional techniques for selecting an application that does not have an interface currently presented on a display are often confusing, take up valuable display space, or cannot be universally applied across different devices. Some conventional techniques, for example, enable selection of an application through onscreen controls in a persistent task bar. These onscreen controls, however, take up valuable display real estate.

Some other conventional techniques enable selection of an application through hardware, such as hot keys and buttons. At best these techniques require users to remember what key, key combination, or hardware button to select. Even in such a case, users often accidentally select incorrect keys or buttons. Further, in many cases hardware-selection techniques cannot be universally applied, as hardware on computing devices can vary by device model, generation, vendor, or manufacturer. In such cases, either the techniques will not work or work differently across different computing devices. This exacerbates the problem of users needing to remember the correct hardware configuration, as many users have multiple devices, and so may need to remember different hardware selections for different devices. Further still, for many computing devices hardware selection forces users to engage a computing device outside the user's normal flow of interaction, such as when a touch-screen device requires a user to change his or her mental and physical orientation from display-based interactions to hardware-based interactions.

SUMMARY

This document describes techniques and apparatuses enabling thumbnail-image selection of applications. In some embodiments, these techniques and apparatuses enable a user interface having selectable thumbnail images for applications not currently exposed on a display. The techniques and apparatuses may enable selection of this user interface through a simple gesture that is both easy-to-use and remember. Further, selection of applications not currently exposed on the display may be selected through thumbnail images representing each application's application interface as it will appear on selection.

This summary is provided to introduce simplified concepts for thumbnail-image selection of applications that are further described below in the Detailed Description. This summary is not intended to identify essential features of the claimed subject matter, nor is it intended for use in determining the scope of the claimed subject matter. Techniques and/or apparatuses enabling thumbnail-image selection of applications are also referred to herein separately or in conjunction as the "techniques" as permitted by the context.

BRIEF DESCRIPTION OF THE DRAWINGS

Embodiments enabling thumbnail-image selection of applications, along with other embodiments enabling other techniques, are described with reference to the following drawings. The same numbers are used throughout the drawings to reference like features and components.

DETAILED DESCRIPTION

Overview

This document describes techniques and apparatuses enabling thumbnail-image selection of applications. These techniques, in some embodiments, enable a user to quickly and easily select applications.

Consider a case where a user visits a shopping website and finds a toy horse for his niece's birthday, then interacts with a local word-processing document, then visits the same shopping website and finds coloring books for his niece's birthday, then visits a social-networking website, and then visits a web-enabled radio website. Assume that the user, when listening to songs on the radio website, decides to revisit the shopping website to buy the toy horse.

The user may, for example, simply select, though a gesture starting at an edge of his display and "swiping" away from that edge into the display, to quickly see at a large or thumbnail size, the social-networking website. The user may swipe again to revisit the shopping website having the coloring books and so forth until the page having the toy horse appears. The techniques, however, may also or instead permit the user to see multiple thumbnail images at once, the images representing how the application's interface will appear on selection. Thus, with a simple gesture selecting to see these thumbnail images, the techniques may present thumbnails showing a picture of the toy horse as it will be shown in the shopping website, the word-processing document that the user last opened (rather than an icon for word-processing application) in a thumbnail image, another thumbnail for the shopping website showing the coloring books, and a thumbnail image showing the social-networking website as it will be presented if selected. In so doing, the user may easily see which webpage has the toy horse and so quickly and easily select that webpage. On selection of the thumbnail having the toy horse, the techniques present the shopping website showing the toy horse rather than the coloring books.

This is but one example of many ways in which the techniques enabling thumbnail-image selection of applications, others of which are described below.

Example System

Figure 1:
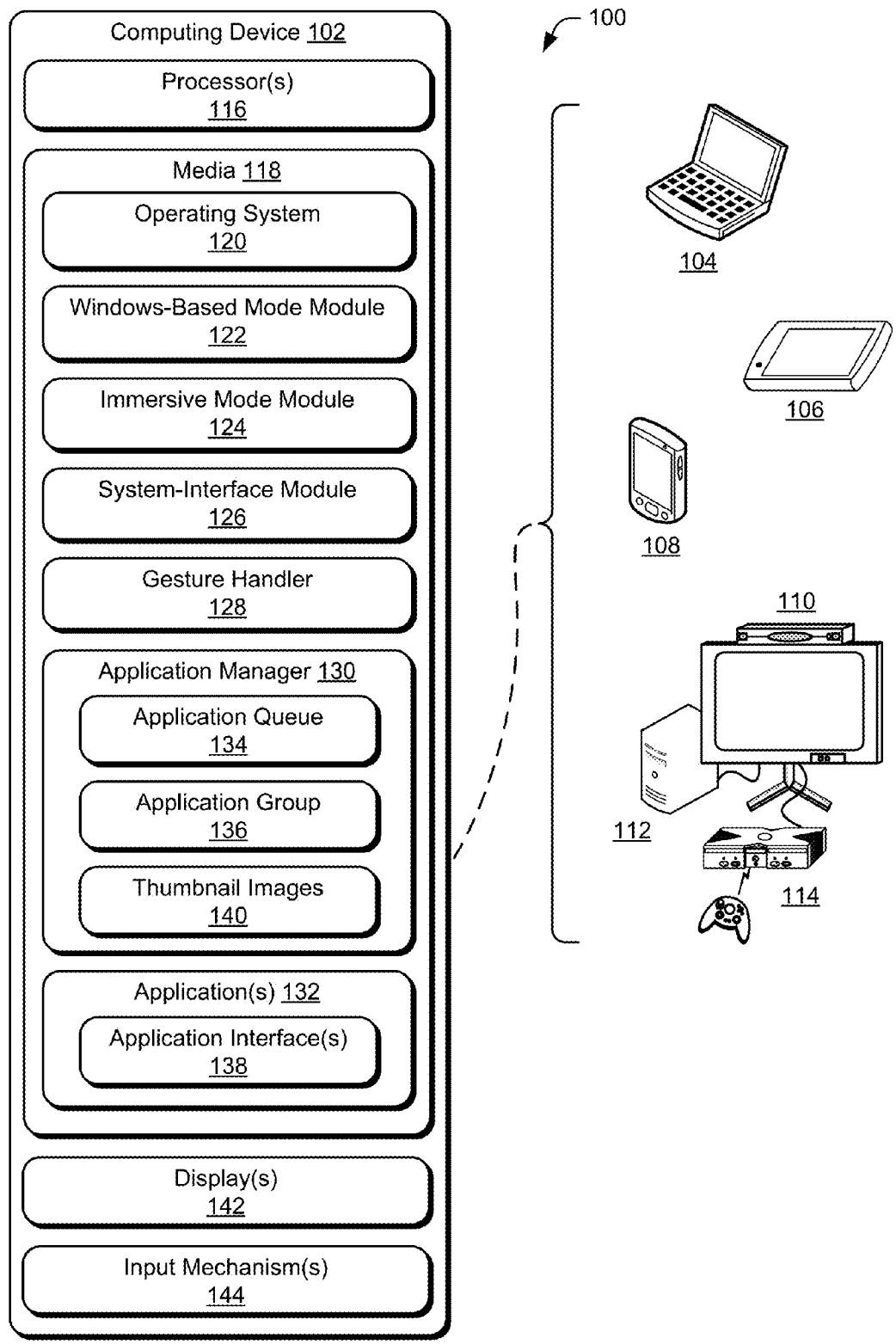
FIG. 1 illustrates an example system in which techniques for thumbnail-image selection of applications can be implemented.

FIG. 1 illustrates an example system 100 in which techniques for thumbnail-image selection of applications can be embodied. System 100 includes a computing device 102, which is illustrated with six examples: a laptop computer 104, a tablet computer 106, a smart phone 108, a set-top box 110, a desktop computer 112, and a gaming device 114, though other computing devices and systems, such as servers and netbooks, may also be used.

Computing device 102 includes computer processor(s) 116 and computer-readable storage media 118 (media 118). Media 118 includes an operating system 120, windows-based mode module 122, immersive mode module 124, system-interface module 126, gesture handler 128, application manager 130, and one or more applications 132. Application manager 130 includes or has access to an application queue 134 and/or an application group 136. Application group 136 includes one or more of applications 132, each of which has an application interface 138. One or more thumbnail images 140 are maintained based on application interfaces 138 for those applications in application group 136.

Thumbnail images 140 provide some indication of how an application interface associated with the application will appear or recently appeared (if previously interacted with by the user). In some embodiments, thumbnails images 140 are a smaller or lower-resolution image of the respective application interface as the respective application interface will appear on selection of thumbnail image 140 or as the respective application interface last appeared. These smaller or lower-resolution images may include a portion of the application interface rather than all of the application interface, such as to remove advertisements or other portions of the application interface. The remaining portion may then be reduced in size or may be small enough without reduction. Note also that thumbnail image 140 may be identical, other than size, to the application interface.

Further still, thumbnail image 140 may include moving items, videos, animations, and so forth as they will be or were shown, though often in a small or lower-resolution. Thus, if the toy horse of the above example was shown trotting as an animation or in a video clip, thumbnail image 140 may show this trotting at a smaller size.

Computing device 102 also includes or has access to one or more displays 142 and input mechanisms 144. Four example displays are illustrated in FIG. 1. Input mechanisms 144 may include gesture-sensitive sensors and devices, such as touch-based sensors and movement-tracking sensors (e.g., camera-based), as well as mice (free-standing or integral with a keyboard), track pads, and microphones with accompanying voice recognition software, to name a few. Input mechanisms 144 may be separate or integral with displays 142; integral examples include gesture-sensitive displays with integrated touch-sensitive or motion-sensitive sensors.

Windows-based mode module 122 presents application interfaces 138 through windows having frames. These frames may provide controls through which to interact with application 132 and/or controls enabling a user to move and resize the window.

Immersive mode module 124 provides an environment by which a user may view and interact with one or more of applications 132 through application interfaces 138. In some embodiments, this environment presents content of, and enables interaction with, applications with little or no window frame and/or without a need for a user to manage a window frame's layout or primacy relative to other windows (e.g., which window is active or up front) or manually size or position application interfaces 138.

This environment can be, but is not required to be, hosted and/or surfaced without use of a windows-based desktop environment. Thus, in some cases immersive mode module 124 presents an immersive environment that is not a window (even one without a substantial frame) and precludes usage of desktop-like displays (e.g., a taskbar). Further still, in some embodiments this immersive environment is similar to an operating system in that it is not closeable or capable of being un-installed. While not required, in some cases this immersive environment enables use of all or nearly all of the pixels of a display by applications. Examples of immersive environments are provided below as part of describing the techniques, though they are not exhaustive or intended to limit the techniques described herein.

System-interface module 126 provides one or more interfaces through which interaction with operating system 120 is enabled, such as an application-launching interface, a start menu, or a system tools or options menu, to name just a few.

Operating system 120, modules 122, 124, and 126, as well as gesture handler 128 and application manager 130 can be separate from each other or combined or integrated in any suitable form.

Example Methods

Example methods 200, 800, and 900 address edge gestures, example methods 1400 and 1700 address switching back to a previously-interacted with application, and methods 1900, 2100, and 2300 address thumbnail-image selection of applications. Any one or more of methods 200, 800, 900, 1400, and 1700 may be used separately or in combination with, in whole or in part, methods 1900, 2100, and/or 2300. An edge gesture may be used to select to switch back to a prior application or select to present a user interface having selectable thumbnail images, as but two example ways in which the various methods can be combined or act complimentary, though use of the edge gesture is not required by methods 1400, 1700, 1900, 2100, and/or 2300.

Figure 2:
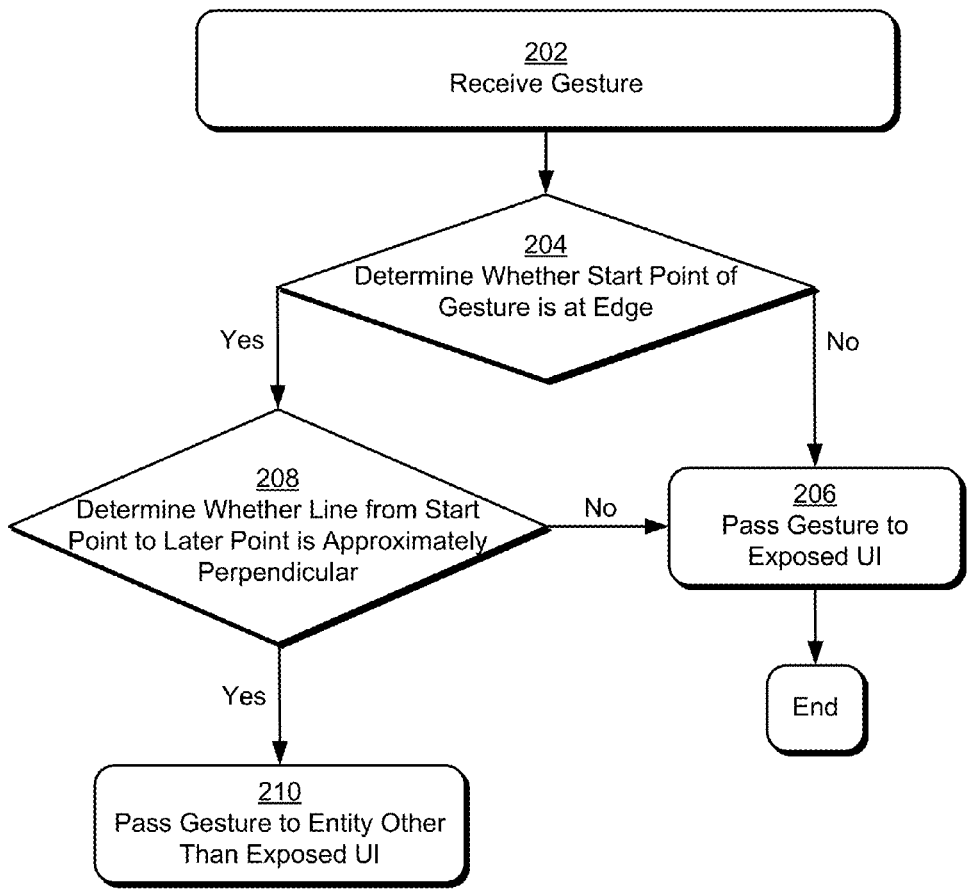
FIG. 2 illustrates an example method for enabling edge gestures that can be used to select to switch back to a previously-interacted-with application, the edge gestures being approximately perpendicular to an edge in which the gesture begins.

FIG. 2 depicts a method 200 for enabling edge gestures based on the edge gesture being approximately perpendicular to an edge in which the gesture begins. In portions of the following discussion reference may be made to system 100 of FIG. 1, reference to which is made for example only.

Block 202 receives a gesture. This gesture may be received at various parts of a display, such as over a windows-based interface, an immersive interface, or no interface. Further, this gesture may be made and received in various manners, such as a pointer tracking a movement received through a touch pad, mouse, or roller ball or a physical movement made with arm(s), finger(s), or a stylus received through a motion-sensitive or touch-sensitive mechanism.

Figure 3:
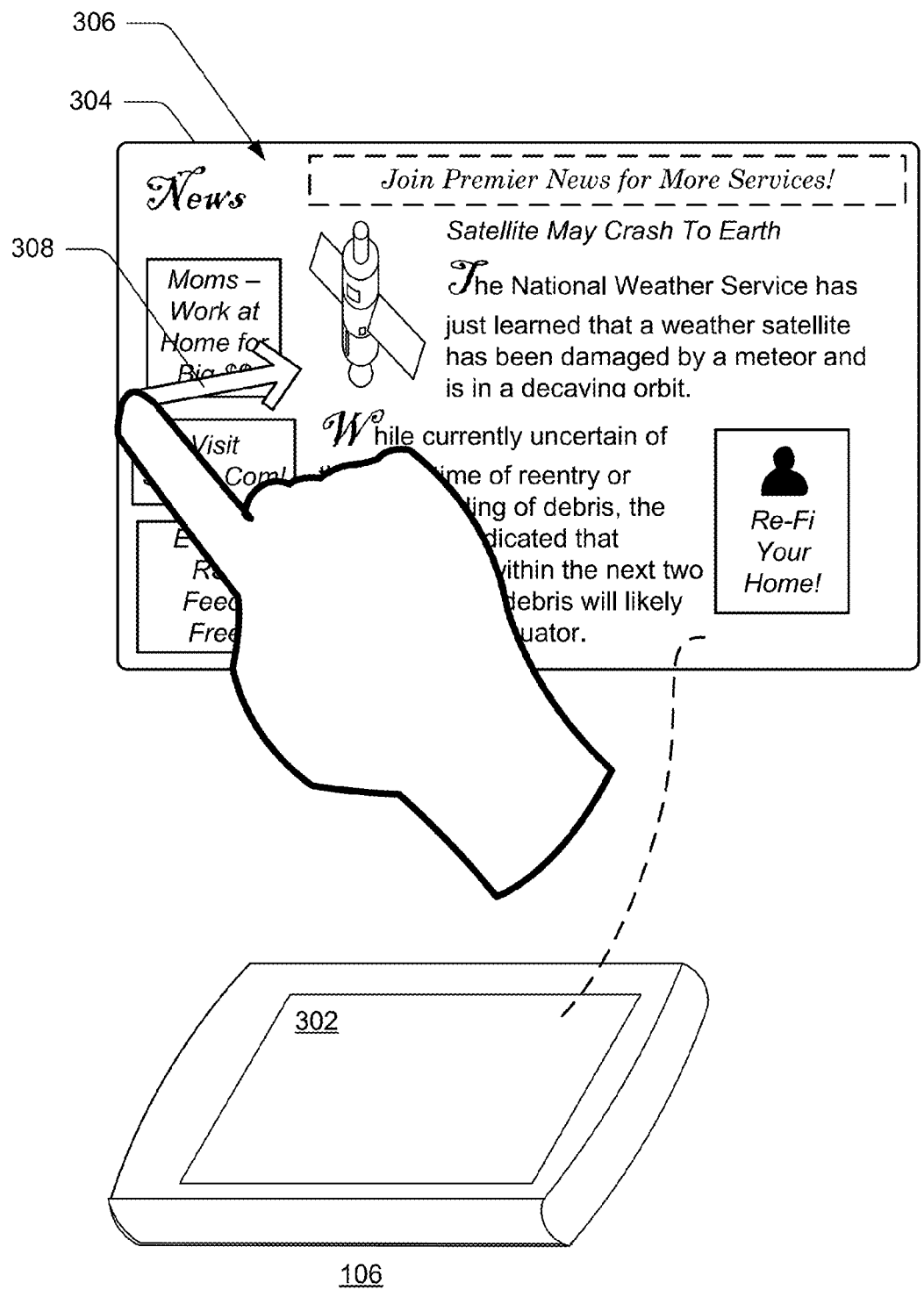
FIG. 3 illustrates an example tablet computing device having a touch-sensitive display presenting an immersive interface.

By way of example consider FIG. 3, which illustrates a tablet computing device 106. Tablet 106 includes a touch-sensitive display 302 shown displaying an immersive interface 304 that includes a webpage 306. As part of an ongoing example, at block 202 gesture handler 128 receives gesture 308 as shown in FIG. 3.

Block 204 determines whether a start point of the gesture is at an edge. As noted above, the edge in question can be an edge of an application interface, whether immersive or windows-based, and/or of a display. In some cases, of course, an edge of an application interface is also an edge of a display. The size of the edge can vary based on various factors about the display or interface. A small display or interface may have a smaller size in absolute or pixel terms than a large display or interface. A highly sensitive input mechanism permits a smaller edge as well. Example edges are rectangular and vary between one and twenty pixels in one dimension and an interface limit of the interface or display in the other dimension, though other sizes and shapes, including convex and concave edges may instead be used.

Figure 4:
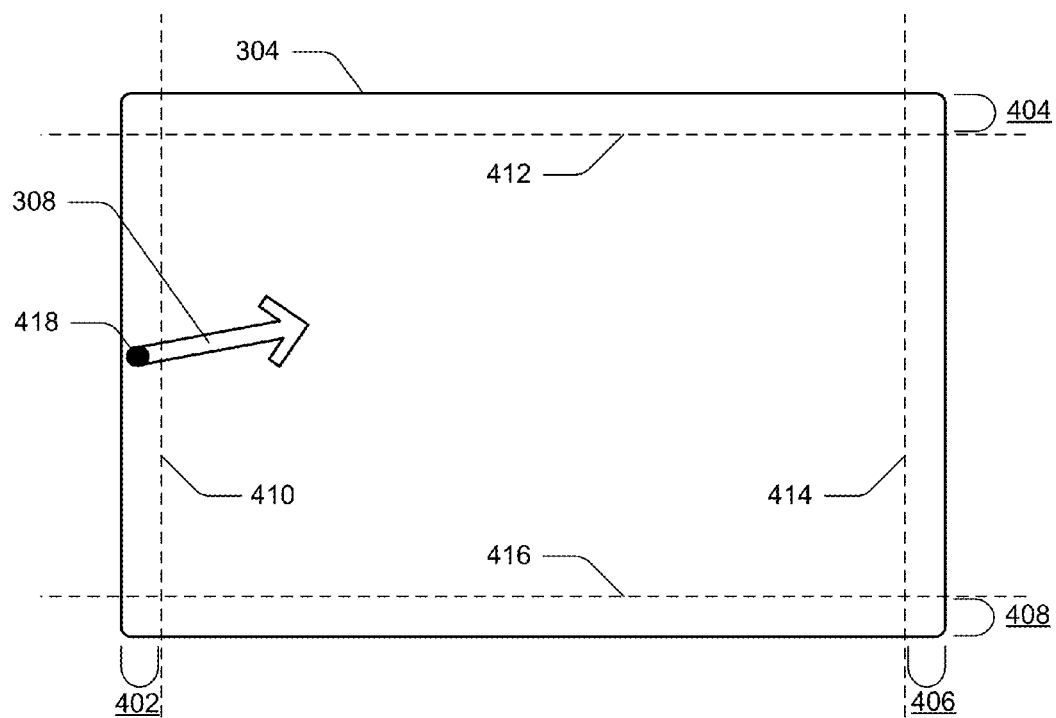
FIG. 4 illustrates the example immersive interface of FIG. 3 along with example edges.

Continuing the ongoing example, consider FIG. 4, which illustrates immersive interface 304 and gesture 308 of FIG. 3 as well as left edge 402, top edge 404, right edge 406, and bottom edge 408. For visual clarity webpage 306 is not shown. In this example the dimensions of the interface and display are of a moderate size, between that of smart phones and that of many laptop and desktop displays. Edges 402, 404, 406, and 408 have a small dimension of twenty pixels, an area of each shown bounded by dashed lines at twenty pixels from the display or interface limit at edge limit 410, 412, 414, and 416, respectively.

Gesture handler 128 determines that gesture 308 has a start point 418 and that this start point 418 is within left edge 402. Gesture handler 128 determines the start point in this case by receiving data indicating [X,Y] coordinates in pixels at which gesture 308 begins and comparing the first of these coordinates to those pixels contained within each edge 402-408. Gesture handler 128 often can determine the start point and whether it is in an edge faster than a sample rate, thereby causing little or no performance downgrade from techniques that simply pass gestures directly to an exposed interface over which a gesture is made.

Returning to method 200 generally, if block 204 determines that the start point of the gesture is not at an edge, method 200 proceeds along a "No" path to block 206. Block 206 passes the gestures to an exposed application interface, such as an underlying interface over which the gesture was received. Altering the ongoing example, assume that gesture 308 was determined not to have a start point within an edge. In such a case gesture handler 128 passes buffered data for gesture 308 to immersive application interface 304. After passing the gesture, method 200 ends.

If block 204 determines that the start point of the gesture is in an edge, method 200 proceeds along a "Yes" path to block 208. Block 208 responds to the positive determination of block 204 by determining whether a line from the start point to a later point of the gesture is approximately perpendicular from the edge.

Block 208, in some embodiments, determines the later point used. Gesture handler 128, for example, can determine the later point of the gesture based on the later point being received a preset distance from the edge or the start point, such as past edge limit 410 for edge 402 or twenty pixels from start point 418, all of FIG. 4. In some other embodiments, gesture handler 128 determines the later point based on it being received a preset time after receipt of the start point, such an amount of time slightly greater than used generally by computing device 102 to determine that a gesture is a tap-and-hold or hover gesture.

For the ongoing embodiment, gesture handler 128 uses a later-received point of gesture 308 received outside of edge 402 so long as that later-received point is received within a preset time. If no point is received outside of the edge within that preset time, gesture handler 128 proceeds to block 206 and passes gesture 308 to immersive interface 304.

Using the start point, block 208 determines whether a line from the start point to the later point of the gesture is approximately perpendicular to the edge. Various angles of variance can be used in this determination by block 208, such as five, ten, twenty, or thirty degrees.

Figure 5:
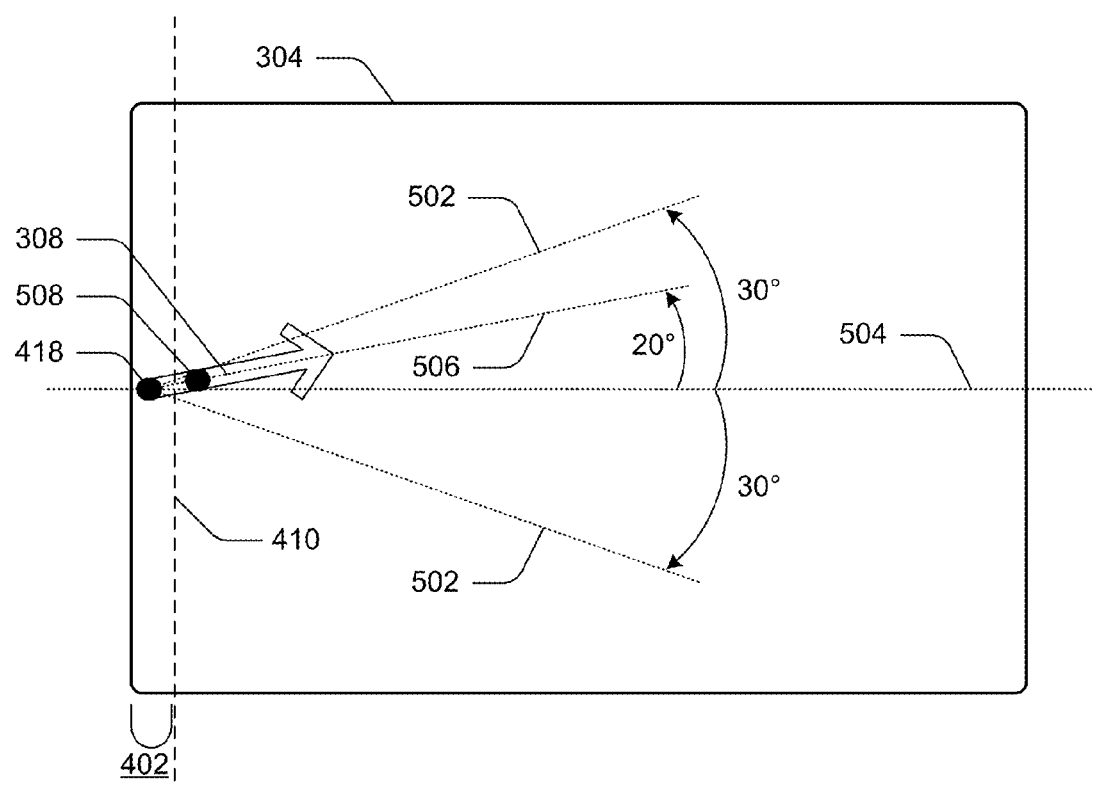
FIG. 5 illustrates the example immersive interface of FIGS. 3 and 4 along with angular variance lines from a perpendicular line and a line from a start point to a later point of a gesture.

By way of example, consider an angle of variance of thirty degrees from perpendicular. FIG. 5 illustrates this example variance, showing immersive interface 304, gesture 308, left edge 402, left edge limit 410, and start point 418 of FIGS. 3 and 4 along with a thirty-degree variance lines 502 from perpendicular line 504. Thus, gesture handler 128 determines that line 506 from start point 418 to later point 508 (which is at about twenty degrees from perpendicular) is approximately perpendicular based on being within the example thirty-degree variance line 502.

Generally, if block 208 determines that the line is not approximately perpendicular to the edge, method 200 proceeds along a "No" path to block 206. As noted in part above, block 208 may also determine that a later point or other aspect of a gesture disqualifies the gesture. Examples include when a later point is within the edge, such as due to a hover, tap, press-and-hold, or up-and-down gesture (e.g., to scroll content in the application interface), or when the gesture is set to be a single-input gesture and a second input is received (e.g., a first finger starts at an edge but a second finger then lands anywhere).

If block 208 determines that the line is approximately perpendicular based a later point outside the edge, method 200 proceeds along a "Yes" path to block 210.

Figure 6:
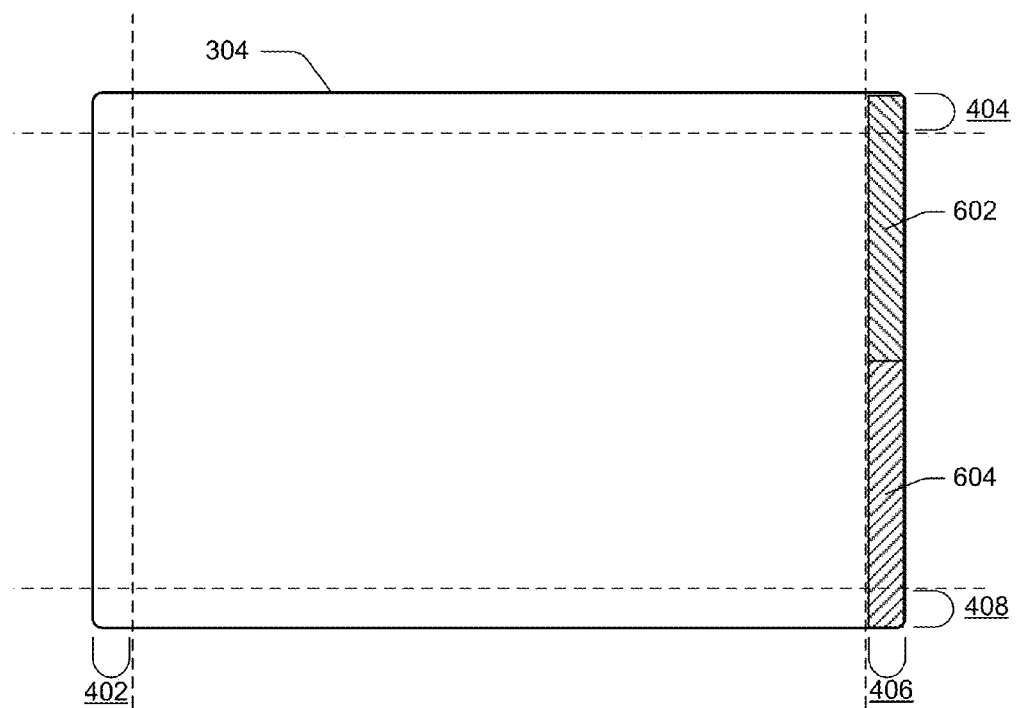
FIG. 6 illustrates the edges of the immersive interface shown in FIG. 4 along with two regions in the right edge.

Block 210 responds to the positive determination of block 208 by passing the gesture to an entity other than the exposed application interface. This entity is not an application interface over which the gesture was received, assuming it was received over an application interface at all. Block 210 may determine to which entity to pass the gesture as well, such as based on an edge or region of an edge in which the start point of the gesture is received. Consider FIG. 6, for example, which illustrates immersive interface 304 and edges 402, 404, 406, and 408 of FIG. 4 but adds top region 602 and bottom region 604 to right edge 406. A start point in top region 602 can result in a different entity (or even a same entity but a different application interface provided in response) than a start point received to bottom region 604. Likewise, a start point in top edge 404 can result in a different entity or interface than left edge 402 or bottom edge 408.

In some cases, this entity is an application associated with the application interface. In such a case, passing the gesture to the entity can be effective to cause the application to present a second application interface enabling interaction with the application. Thus, a media player playing a movie can present a second application interface enabling selection of subtitles or a director's commentary. This capability is permitted in FIG. 1, where one of applications 132 can include or be capable of presenting more than one application interface 138. Thus, block 210 can pass the gesture to system-interface module 126, the one of applications 132 currently presenting the application interface, or another of applications 132, to name just three possibilities.

Figure 7:
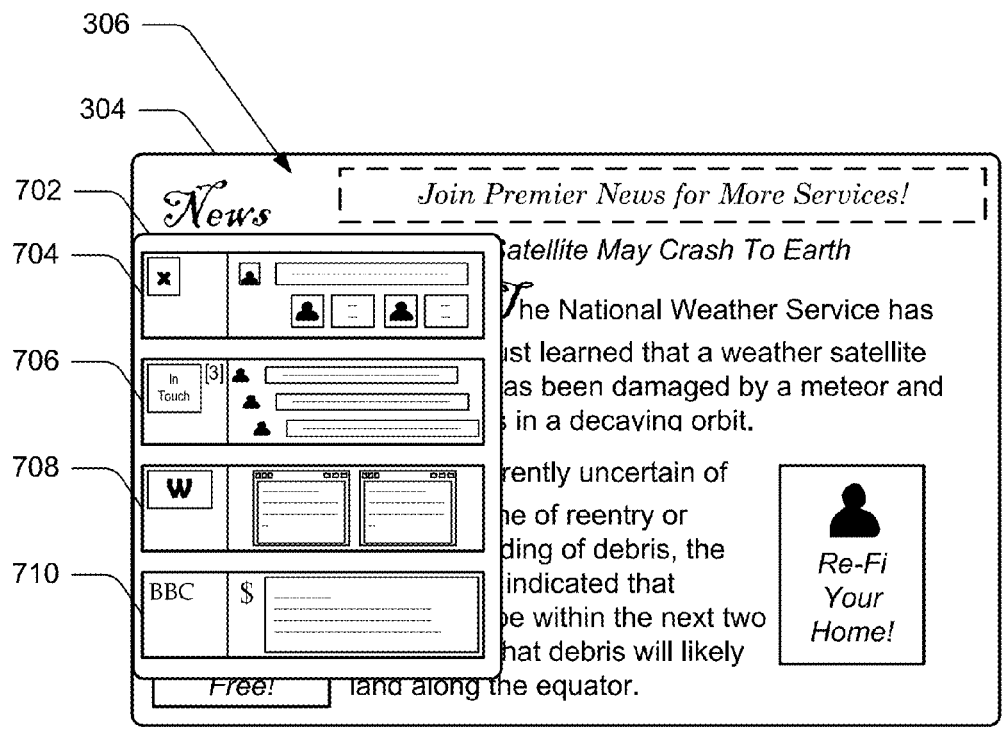
FIG. 7 illustrates a tile-based application-selection interface presented by a system-interface module in response to an edge gesture made over the immersive interface and webpage of FIG. 3.

Concluding the ongoing embodiment, at block 210 gesture handler 128 passes gesture 308 to system-interface module 126. System-interface module 126 receives the buffered portion of gesture 308 and continues to receive the rest of gesture 308 as it is made by the user. FIG. 7 illustrates a possible response upon receiving gesture 308, showing an application-selection interface 702 presented by system-interface module 126 and over immersive interface 304 and webpage 306 from FIG. 3. Application-selection interface 702 enables selection of various other applications and their respective interfaces at selectable application tiles 704, 706, 708, and 710.

The example application-selection interface 702 is an immersive application interface presented using immersive mode module 124, though this is not required. Presented interfaces may instead be windows-based and presented using windows-based module 122. Both of these modules are illustrated in FIG. 1.

Block 210 may also or instead determine to pass the gesture to different entities and/or interfaces based on other factors about the gesture received. Example factors are described in greater detail in method 800 below.

Note that method 200 and other methods described hereafter can be performed in real-time, such as while a gesture is being made and received. This permits, among other things, an application interface presented in response to a gesture to be presented prior to completion of the gesture. Further, the application interface can be presented progressively as the gesture is received. This permits a user experience of dragging out the application interface from the edge as the gesture is performed with the application interface appearing to "stick" to the gesture (e.g., to a mouse pointer or person's finger making the gesture).

Figure 8:
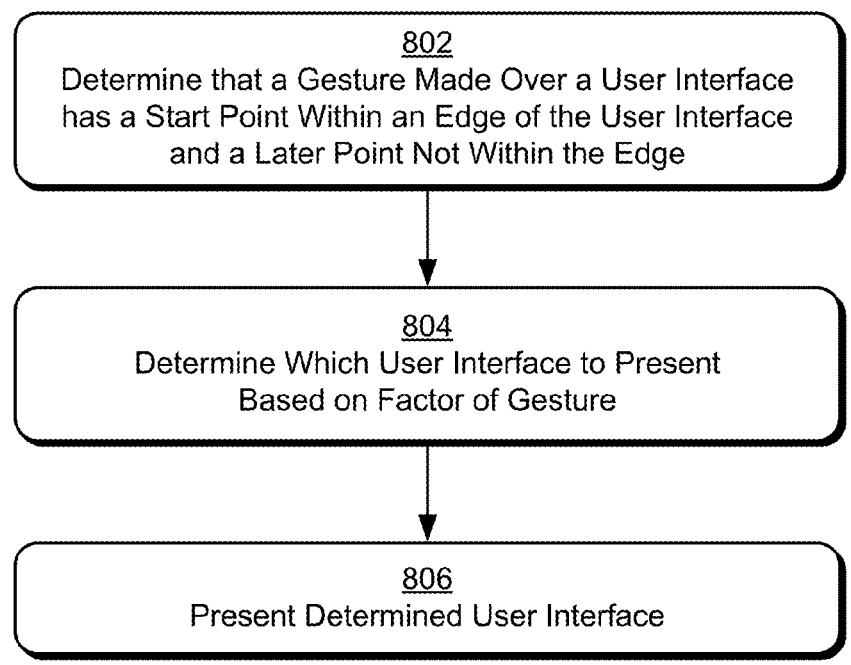
FIG. 8 illustrates an example method for enabling edge gestures including determining an interface to present based on some factor of the gesture.

FIG. 8 depicts a method 800 for enabling edge gestures including determining an interface to present based on some factor of the gesture. In portions of the following discussion reference may be made to system 100 of FIG. 1, reference to which is made for example only. Method 800 may act wholly or partly separate from or in conjunction with other methods described herein.

Block 802 determines that a gesture made over an application interface has a start point at an edge of the application interface and a later point not within the edge. Block 802 may operate similarly to or use aspects of method 200, such as determining a later point on which to base block 802's determination. Block 802 may act differently as well.

In one case, for example, block 802 determines that a gesture is a single-finger swipe gesture starting at an edge of an exposed immersive application interface and having a later point not at the edge but not based on an angle of the gesture. Based on this determination, block 802 proceeds to block 804 rather than pass the gesture to the exposed immersive application interface.

Block 804 determines which interface to present based on one or more factors of the gesture. Block 804 may do so based on a final or intermediate length of the gesture, whether the gesture is single or multi-point (e.g., a single-finger or multi-finger gesture), or a speed of the gesture. Thus, block 804 may determine to present a start menu in response to a multi-finger gesture, an application-selection interface in response to a relatively short single-finger gesture, or a system-control interface permitting selection to shut down computing device 102 in response to relatively long single-finger gesture, for example. To do so, gesture handler 128 may determine the length of the gesture or a number of inputs (e.g., fingers). In response, block 806 presents the determined application interface.

Assume, by way of example, that gesture handler 128 determines, based on a factor of the gesture, to present an application interface enabling interaction with operating system 120. In response, system-interface module 126 presents this application interface. Presentation of the application interface can be similar to manners described in other methods, such as with a progressive display of application-selection user interface 702 of FIG. 7.

Figure 9:
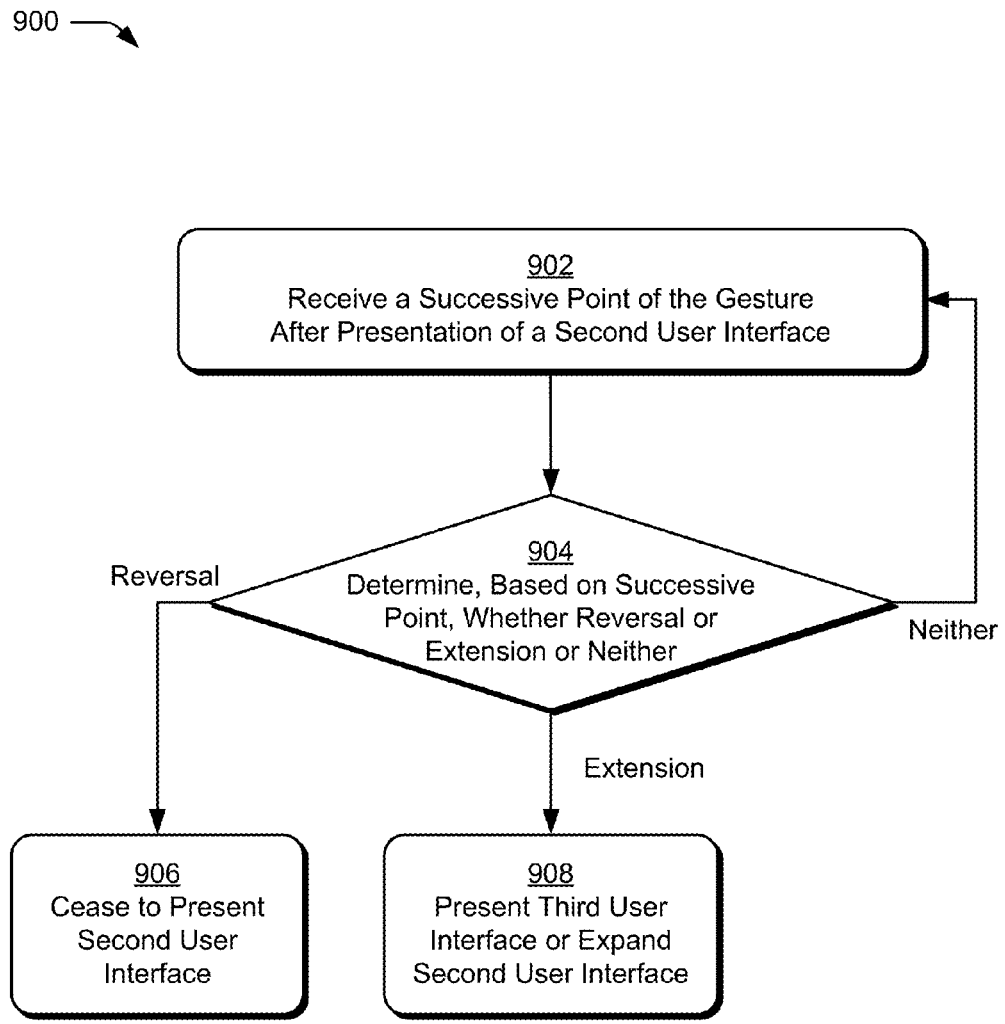
FIG. 9 illustrates an example method enabling expansion of, or ceasing presentation of, an application interface presented in response to an edge gesture or presentation of another application interface.

Following method 200 and/or method 800 in whole or in part, the techniques may proceed to perform method 900 of FIG. 9. Method 900 enables expansion of an application interface, presentation of another interface, or ceasing presentation of the application interface presented in response to an edge gesture.

Block 902 receives a successive point of the gesture and after presentation of at least some portion of the second application interface. As noted in part above, methods 200 and/or 800 are able to present or cause to be presented a second application interface, such as a second application interface for the same application associated with a current application interface, a different application, or a system interface.

Figure 10:
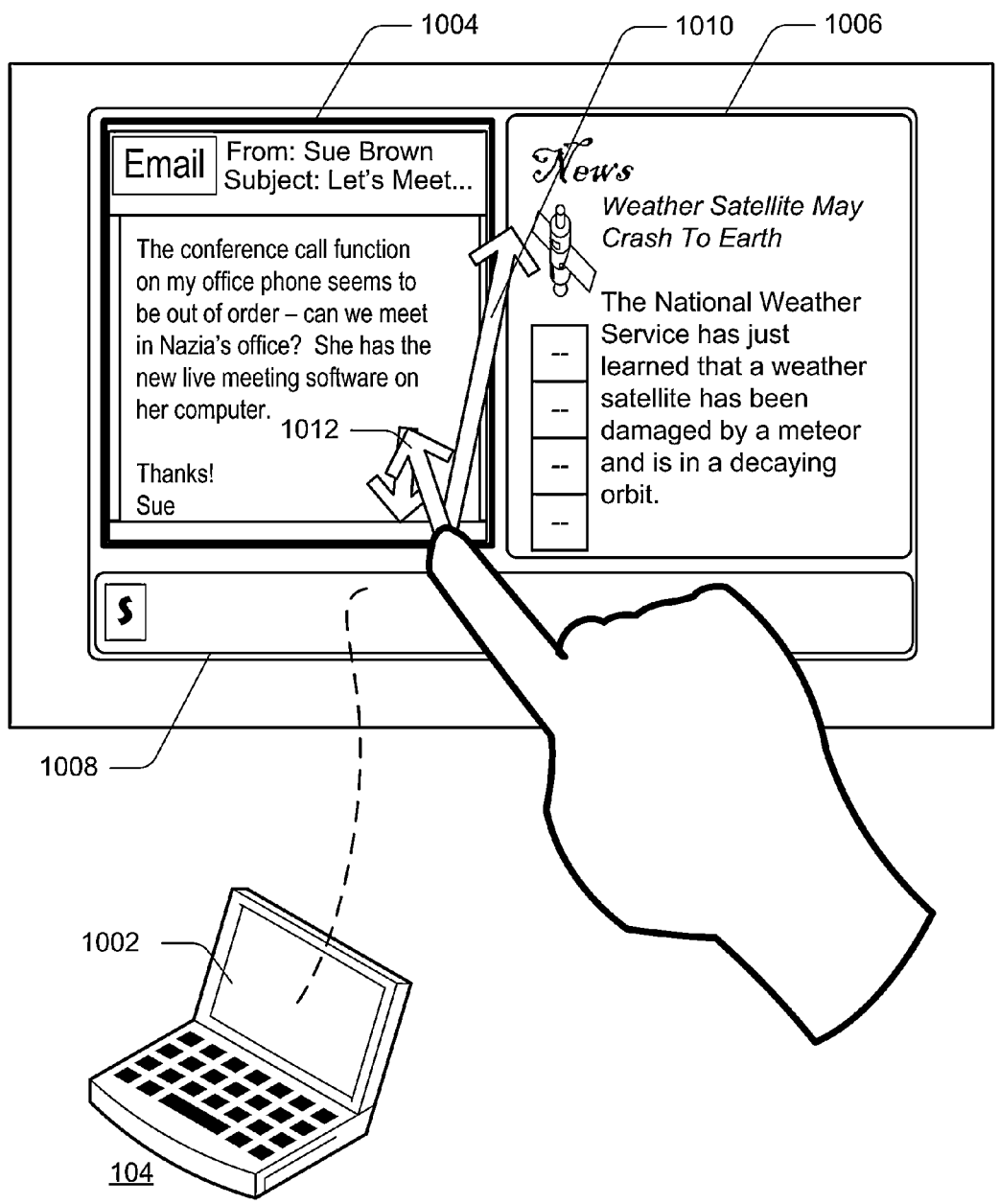
FIG. 10 illustrates a laptop computer having a touch-sensitive display having a windows-based email interface and two immersive interfaces.

By way of example, consider FIG. 10, which illustrates a laptop computer 104 having a touch-sensitive display 1002 displaying a windows-based email interface 1004 and two immersive interfaces 1006 and 1008. Windows-based email interface 1004 is associated with an application that manages email, which can be remote or local to laptop computer 104. FIG. 10 also illustrates two gestures, 1010 and 1012. Gesture 1010 proceeds in a straight line while gesture 1012 reverses back (shown with two arrows to show two directions).

Figure 11:
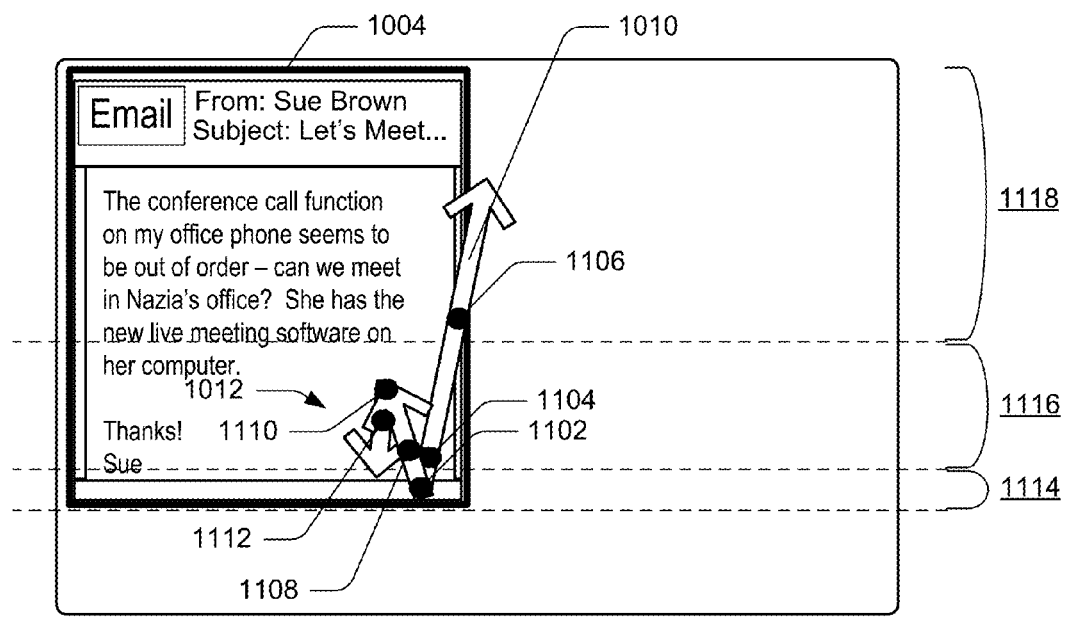
FIG. 11 illustrates the interfaces of FIG. 10 along with two gestures having a start point, later points, and one or more successive points.

FIG. 11 illustrates gesture 1010 having a start point 1102, a later point 1104, and a successive point 1106, and gesture 1012 having a same start point 1102, a later point 1108, and a first successive point 1110, and a second successive point 1112. FIG. 11 also shows a bottom edge 1114, a later-point area 1116, and an interface-addition area 1118.

Block 904 determines, based on the successive point, whether the gesture includes a reversal, an extension, or neither. Block 904 may determine a reversal by determining that a successive point is at the edge or is closer to the edge than a prior point of the gesture. Block 904 may determine that the gesture extends based on the successive point being a preset distance from the edge or the later point. If neither of these is determined to be true, method 900 may repeat blocks 902 and 904 to receive and analyze additional successive points until the gesture ends. If block 904 determines that there is a reversal, method 900 proceeds along "Reversal" path to block 906. If block 904 determines that the gesture is extended, method 900 proceeds along an "Extension" path to block 908.

In the context of the present example, assume that gesture handler 128 receives first successive point 1110 of gesture 1012. Gesture handler 128 then determines that first successive point 1110 is not at edge 1114, is not closer than a prior point of the gesture to edge 1114 (e.g., is not closer than later point 1108), and is not a preset distance from the edge or later point by not being within interface-addition region 1118. In such a case method 900 returns to block 902.

Figure 12:
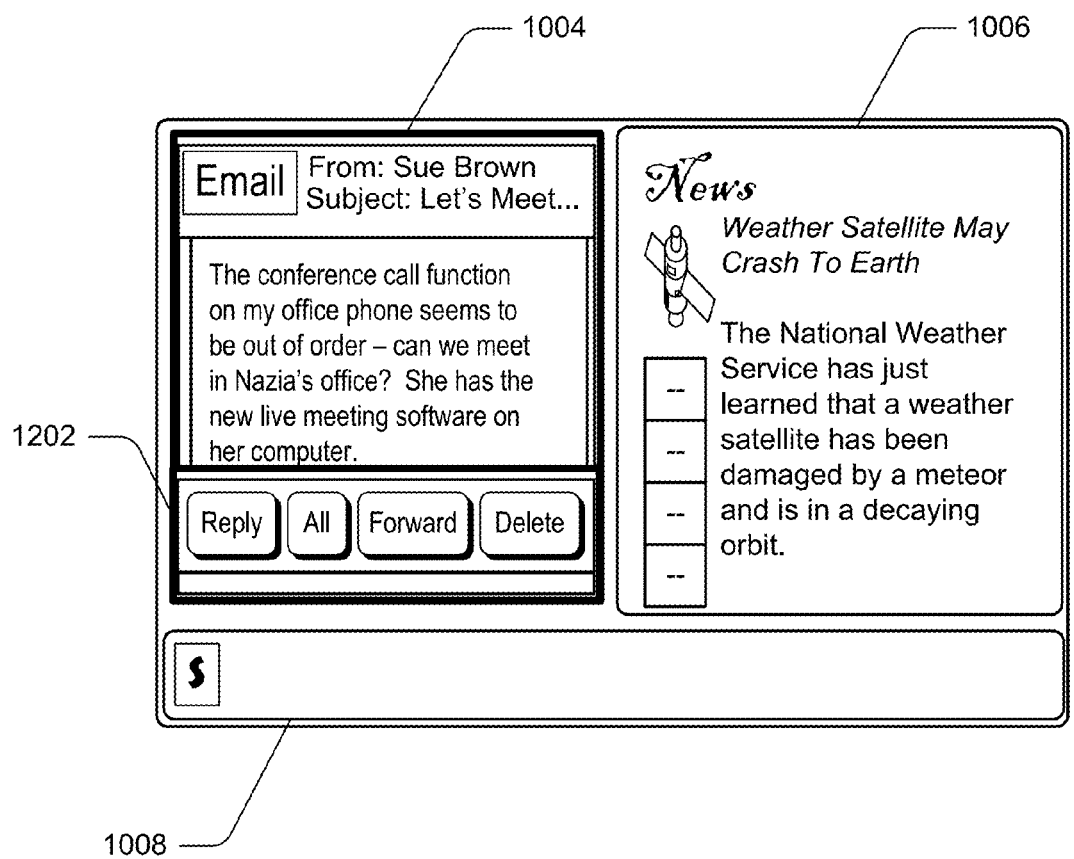
FIG. 12 illustrates the windows-based email interface of FIGS. 10 and 11 along with an email handling interface presented in response to an edge gesture.

On a second iteration of block 902, assume that gesture handler 128 receives second successive point 1112. In such a case, gesture handler 128 determines that second successive point 1112 is closer to edge 1114 than first successive point 1110 and thus gesture 1012 includes a reversal. Gesture handler 128 then proceeds to block 906 to cease to present the second application interface previously presented in response to the gesture. By way of example, consider FIG. 12, which illustrates an email handling interface 1202. In this example case of block 906, gesture handler 128 causes the email application to cease to present interface 1202 in response to a reversal of gesture 1012 (not shown removed).

Figure 13:
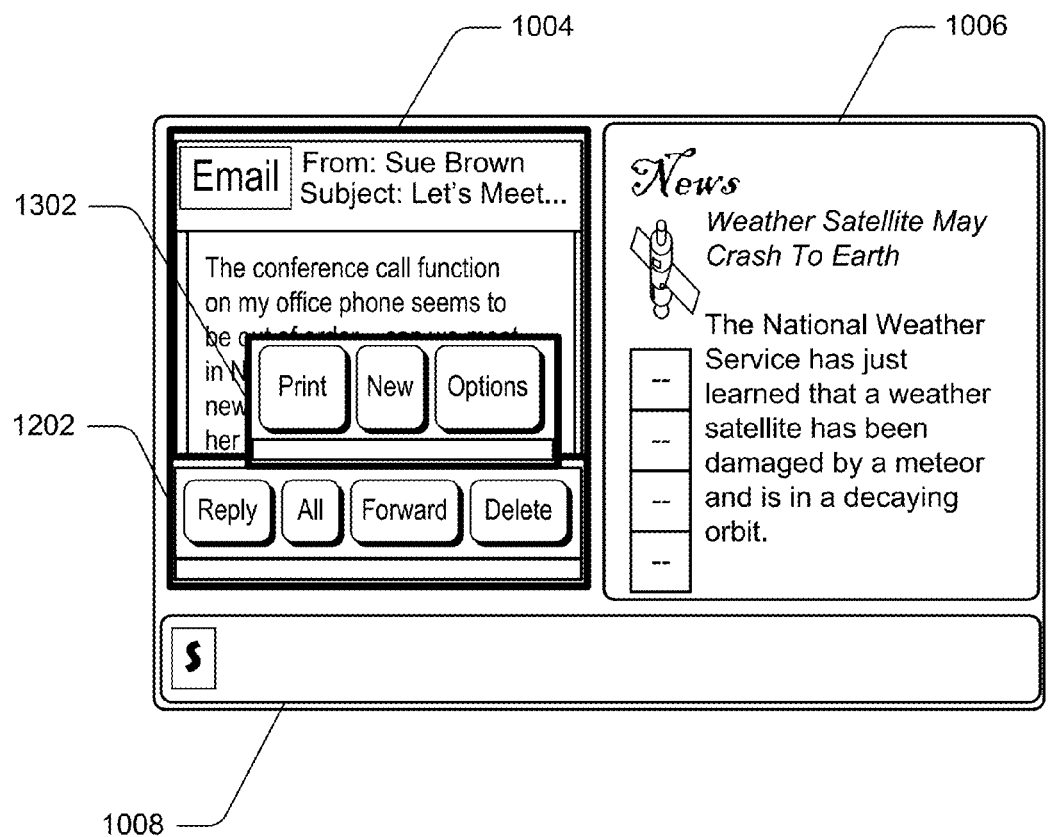
FIG. 13 illustrates the interfaces of FIG. 12 along with an additional-email-options interface presented in response to a gesture determined to have a successive point a preset distance from the edge.

Block 908, however, presents or causes presentation of a third application interface or expansion of the second application interface. Continuing the ongoing example, consider FIG. 13, which illustrates additional-email-options interface 1302 in response to gesture 1010 determined to have successive point 1106 a preset distance from edge 1114, in this case being within interface-addition region 1118 of FIG. 11. This region and preset distance can be set based on a size of the application interface previously presented in response to the gesture. Thus, a user wishing to add additional controls may simply extend the gesture past the application interface presented in response to an earlier portion of the gesture.

Method 900 can be repeated to add additional application interfaces or expand a presented application interface. Returning to the example interface 702 of FIG. 7, for example, gesture handler 128 can continue to add interfaces or controls to interface 702 as gesture 308 extends past interface 702, such as by presenting an additional set of selectable application tiles. If gesture 308 extends past the additional tiles, gesture handler 128 may cause system-interface module 126 to present another interface adjacent the tiles to enable the user to select controls, such as to suspend, hibernate, switch modes (immersive to windows-based and the reverse), or shut down computing device 102.

While the above example application interfaces presented in response to an edge gesture are opaque, they may also be partially transparent. This can be useful by not obscuring content. In the movie example described above, an application interface presented can be partially transparent thereby permitting the movie to be only partially obscured during use of the application interface. Similarly, in the example of FIGS. 12 and 13, interfaces 1202 and 1302 may be partially transparent, thereby enabling a user to see the text of the email while also selecting a control in one of the interfaces.

As noted above, example methods 200, 800, and 900 address edge gestures and are described prior to methods 1400 and 1700, which address switching back to previously-interacted-with applications, which are in turn described prior to methods 1900, 2100, and 2300, which address selection of applications using thumbnail images. Any one or more of these methods may be used separately or in combination with, in whole or in part, any other methods.

Figure 14:
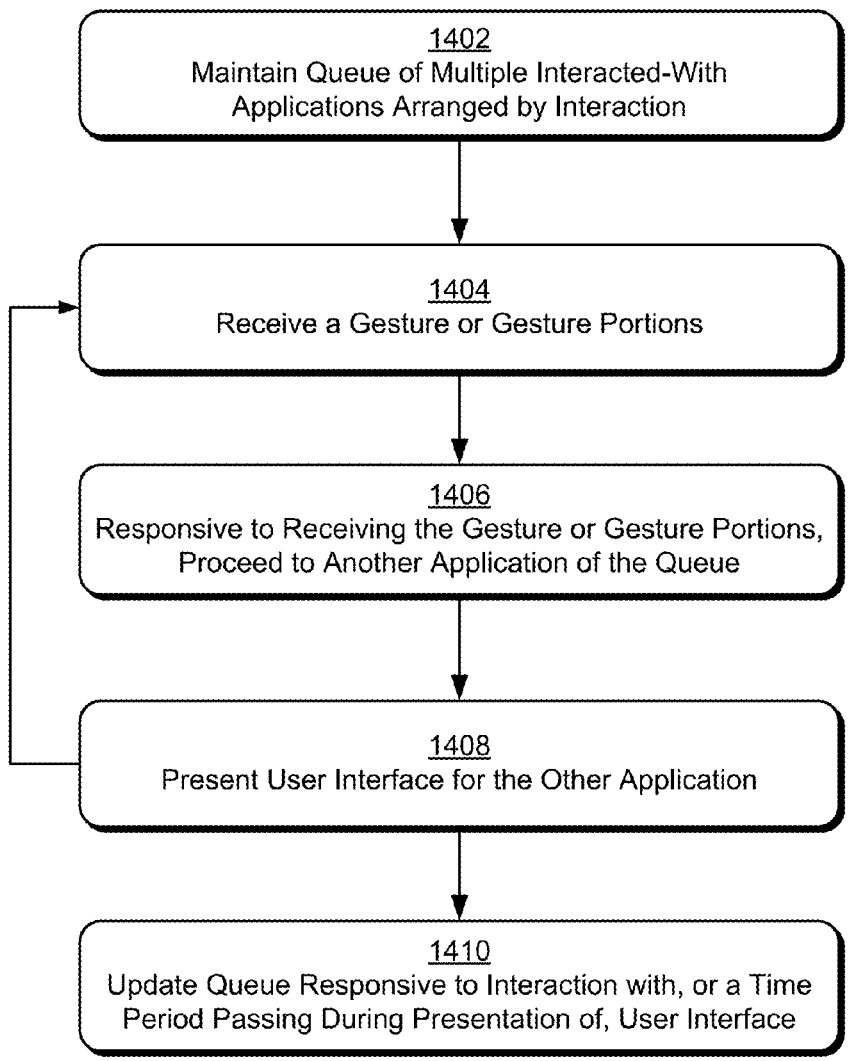
FIG. 14 illustrates a method for switching back to a previously-interacted-with application using a queue.

FIG. 14 depicts a method 1400 for switching back to a previously-interacted-with application using a queue. In portions of the following discussion reference may be made to system 100 of FIG. 1, methods 200, 800, and/or 900, and example embodiments described above, reference to which is made for example only.

Block 1402 maintains a queue of multiple interacted-with applications, the queue arranged by most-recently-interacted-with to least-recently-interacted-with applications other than a current application. Consider, for example, FIG. 15, which illustrates an interaction order 1502 in which a user interacts with various applications. First, the user interacts with a web-searching application 1504 through its interface. Second, the user interacts with a web-enabled media application 1506 through a web browser. Third, the user interacts with a local (non-web) photo application 1508 through its interface. Fourth, the user interacts with a social-networking application 1510 through the web browser. Fifth, the user returns to interacting with the web-enabled media application 1506. Sixth, the user interacts with a web-enabled news application 1512 again through the web browser.

For the first interaction no queue is maintained as no other applications have been interacted with prior to this first interaction. For the second through sixth interactions of interaction order 1502, consider queues 1514, 1516, 1518, 1520, and 1522, which correspond to each interaction in interaction order 1502 after the first interaction, respectively. Queues 1514 to 1522 are example iterations of application queue 134 maintained by application manager 130, both of FIG. 1.

Figure 15:
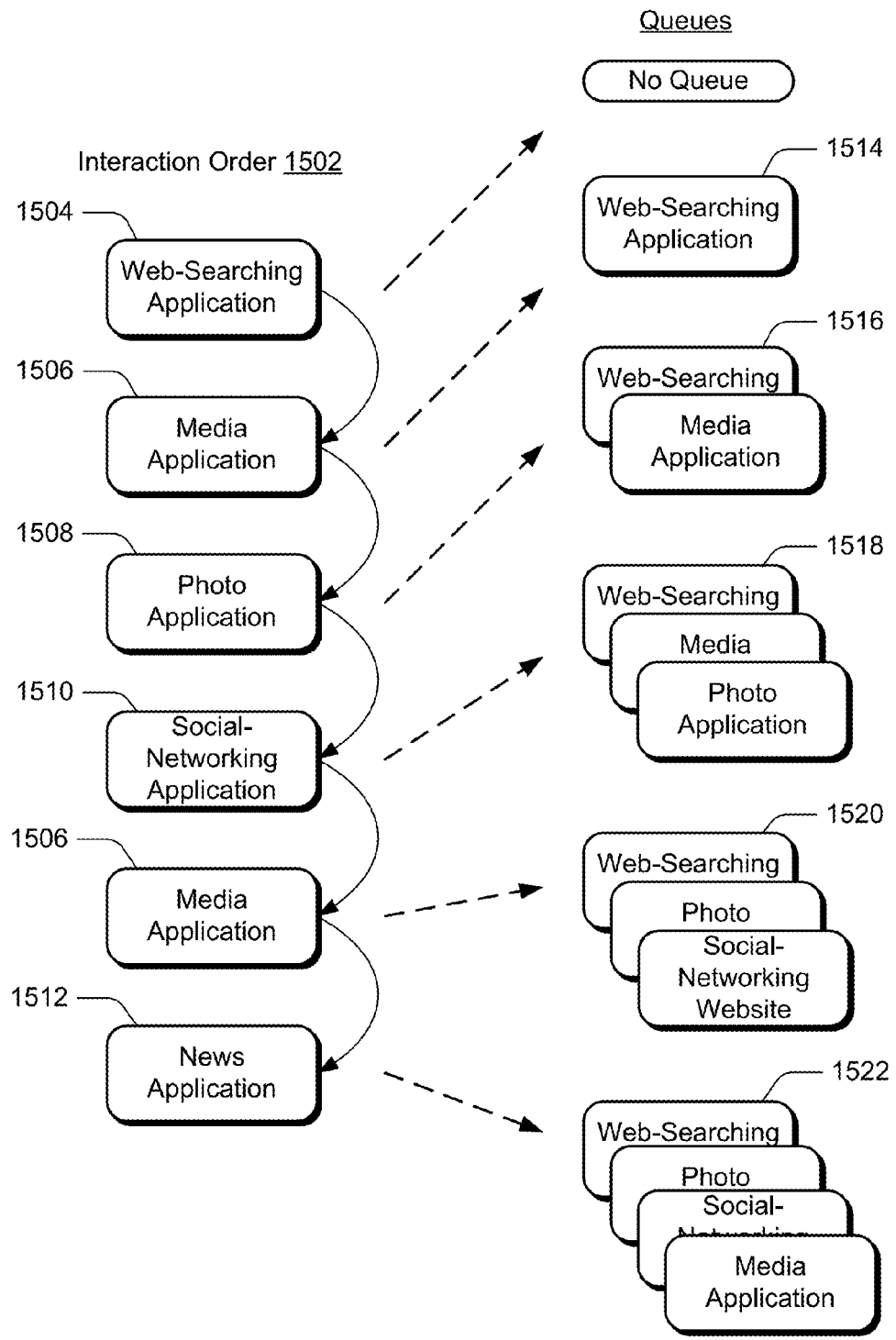
FIG. 15 illustrates an example interaction order in which a user interacts with various applications.

As shown in FIG. 15, application manager 130 keeps application queue 134 up-do-date based on a user's interactions. Queue 1522, for example, includes media application 1506 as the most-recently-interacted application, followed by social-networking application 1510, photo application 1508, and ending with web-searching application 1504. As the user interacts with media application 1506 twice (at the second and fifth interaction) application manager 130 removes it from application queue 134 at the fifth interaction and reorders the other applications to reflect an up-to-date order of interactions but excluding currently-interacted-with applications.

Block 1404 receives a gesture or gesture portions. This gesture or gesture portions can include one or more of the various gestures or portions described elsewhere herein. In some embodiments, gesture portions are received, each portion being part of one gesture and each resulting in presentation of an application in the queue.

Continuing the ongoing embodiment, consider again FIG. 3, which illustrates tablet computing device 106 having touch-sensitive display 302 shown displaying immersive interface 304 including webpage 306. For this example, assume that immersive interface 304 is associated with news application 1512 and that webpage 306 is content from news application 1512.

As part of this example, at block 1404, gesture handler 128 receives gesture 308 as shown in FIG. 3, which gesture handler 128 passes to application manager 130. For the ongoing example, assume that gesture 308 is determined to be associated with switching back to a previously-interacted-with application rather than some other function or application.

Block 1406, responsive to receiving the gesture or gesture portions, proceeds through the queue to another application of the multiple interacted-with applications. Thus, on receiving the gesture or gesture portion(s), application manager 130 may precede to the first, and thus the most-recently-interacted-with of the applications of application queue 134. In some embodiments, on receiving two gestures or portions, application manager 130 may proceed to the second most-recently-interacted-with application of application queue 134, though method 1400 may do so by repeating blocks 1404, 1406 and/or 1408, and so forth as described below.

Continuing the ongoing embodiment, assume that gesture 308 is received after the sixth interaction at which time the currently-interacted-with application is news application 1512 and that application queue 134 is up-to-date and represented by queue 1522 of FIG. 15. In such a case, application manager 130 proceeds to media application 1506 on receiving the gesture or gesture portion.

Block 1408 presents an application interface associated with the other application. This application interface, in some embodiments, is the same application interface through which interaction with the application was previously made. In some embodiments, the application interface is presented as a thumbnail or transparent overlay above the currently presented application interface. Application manager 130 presents this application interface alone or in combination with the associated application, such as by causing the associated application to present the application interface with which the user last interacted.

For this example, application manager 130 presents a thumbnail image of the application interface for the application progressively as gesture 308 is received and then expands the thumbnail to encompass the available real estate of the display when the gesture ends. Application manager 130 thereby replaces webpage 306 in immersive interface 304 or replaces immersive interface 304 with another interface, which can be immersive or windows-based.

Figure 16:
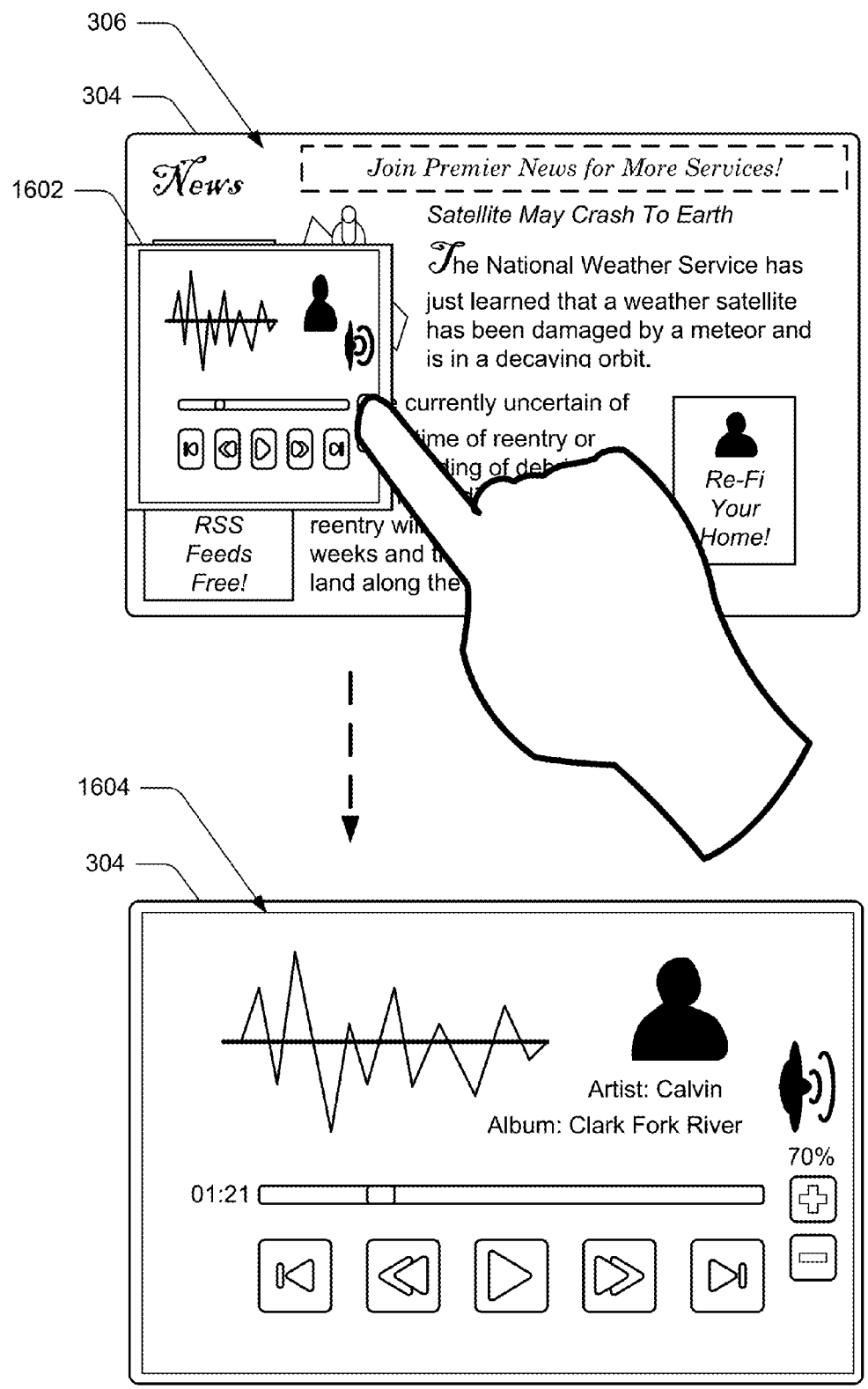
FIG. 16 illustrates the immersive interface of FIG. 3 along with a thumbnail image of an application interface of a prior application.

This is illustrated in FIG. 16 with thumbnail image 1602 of an application interface of media application 1506 presented over immersive interface 304 and webpage 306 of news application 1512. After gesture 308 ends, thumbnail image 1602 expands into full-size application interface 1604, replacing webpage 306 in immersive interface 304. This is but one example manner for presenting the application interface for the selected application, other manners for responding progressively or otherwise are described elsewhere herein.

In some embodiments, block 1408 shrinks the current application interface to a second thumbnail image and passes the second thumbnail image toward a region of a display from which the first-mentioned thumbnail image is progressively presented. Thus, block 1408 expands thumbnail image 1602 into full-size application interface 1604 while shrinking webpage 306 to a thumbnail image and passing that thumbnail to the edge from which thumbnail image 1602 was selected.

During the presentation of the application interface at block 1408, another gesture or gesture portion may be received, returning to block 1404. In some cases, the other gesture or gesture portion is received within an amount of time while the application interface is presented by block 1408. Following the return to block 1404, block 1406 may then proceed to yet another or subsequent application of the multiple interacted-with applications. Continuing this progression, block 1408 then presents an application interface associated with the subsequent application of the multiple interacted-with applications.

Thus, by repeating blocks 1404, 1406, and 1408, application interfaces associated with previously interacted-with applications can be successively presented. In some cases, an application interface associated with a previously-interacted with application can be presented responsive to each gesture received. In the context of the present example, when another gesture is received while presenting the application interface of media application 1506, an application interface associated with social-networking application 1510 (the second most-recently interacted with application of queue 1522) is presented. Receiving yet another gesture or gesture portion during the presentation of the application interface associated with social-networking application 1510 results in a presentation of an application interface associated with photo application 1508 (the third most-recently interacted with application of queue 1522) and so forth.

Following this switch from presenting a current application to presenting another selected, prior application, block 1410 updates the queue responsive to interaction with, or a time period passing during presentation of, the application interface associated with the other application. In some cases a prior application may be selected and then another quickly selected after it, effectively a scanning through of the applications in the queue. In such cases, block 1410 may forgo updating the queue, as a quick viewing may not be considered an interaction.

Example interactions with which application manager 130 updates application queue 134 include an explicit selection to interact with the newly presented interface, such as to control playback or edit information relating to currently playing media using controls shown in full-size application interface 1604 of a media player. In other cases an interaction is determined based on a time period passing. Assume, for example, that the news application's webpage is presented on selection rather than being the current application. After some period, such as one, two, or three seconds, for example, application manager 130 determines that the delay is effectively an interaction based on a likelihood that the user is reading the news article in the webpage. Similarly, presentation of an application interface for a media application at block 1408 that is playing media and remains on the display without another selection of applications in application queue 134 can also be considered an interaction.

As noted in part above, application queue 134 can be circular. In so doing, selection of applications is not stopped but rather rolls if a user reaches a least-recently-interacted with application of application queue 134. For example, on selecting to switch back to a prior application from social-networking application 1510 and thus using queue 1518, switching back once results in selecting photo application 1508, twice results in media application 1506, and three times to web-searching application 1504. A fourth selection to switch back returns, in a circular fashion, to again result in presenting photo application 1508.

Method 1400 describes various ways in which the techniques can enable selection of previously-interacted-with applications and determine which to present based on a queue. Method 1700 may operate in conjunction with method 1400 and other methods described herein, though using a queue is not required. Therefore, method 1400 is not intended to limit the techniques as described in example method 1700.

Figure 17:
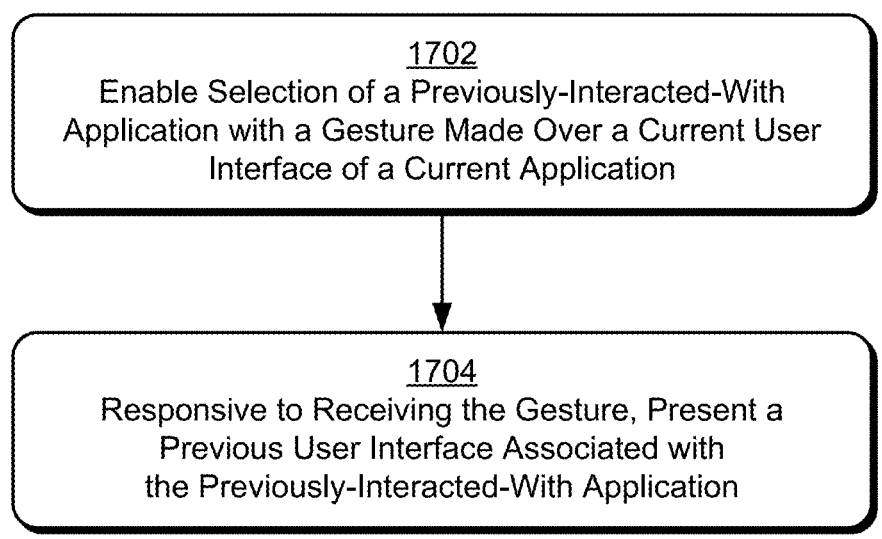
FIG. 17 illustrates a method for switching back to a previously-interacted-with application, which may or may not use a queue.

FIG. 17 depicts a method 1700 for switching back to a previously-interacted-with application, which may or may not use a queue. In portions of the following discussion reference may be made to system 100 of FIG. 1, methods 200, 800, 900, 1400, and example embodiments described above, reference to which is made for example only.

Block 1702 enables selection of a previously-interacted-with application through a gesture made over a current application interface associated with a current application. Block 1702 may do so in various manners described above, such as with an edge gesture or portion thereof, as but one example.

Block 1704, responsive to receiving the gesture and without further selection, presents a previous application interface associated with the previously-interacted-with application.

Assume, for example, that a portion of a gesture is received associated with selection of a prior application, such as an edge gesture starting at an edge of the current application interface and proceeding approximately perpendicularly away from the edge. In response, block 1704 presents the application interface for the previously-interacted-with application or a thumbnail image of the interface, or some indicator that selection has successfully been made along with an indicator of the application or the interface selected.

Example thumbnail images or indicators include any of selectable application tiles 704, 706, 708, and 710 of FIG. 7 some of which include a thumbnail image of an interface while others indicate the application selected. Another example is thumbnail image 1602 of FIG. 16.

Block 1704 presents the application interface of the selected, previously-interacted-with application, as shown in FIG. 16 at full-size application interface 1604. In so doing, block 1704 may enable interaction with photo application 1508 through immersive interface 304 without further selection. Thus, a user after selecting, with as little as one gesture, a prior application may interact without needing to make another selection. The user need not select to exit an application-selection mode, for example, or make the presented interface "live" or primary or on top of the stack. Simply put, the techniques enable selection of a prior application and further interaction with that prior application with a single input.

In this example of FIG. 16, immediately after full-size application interface 1604 is presented and replaces webpage 306, a next input to immersive interface 304 is passed immediately to photo application 1508. Thus, a tap, hot key, or other input is passed directly to photo application 1508, thereby enabling an immediate response by photo application 1508 to the input.

In some embodiments, the gesture made over the current application interface includes portions, each of which indicates a selection of a prior application. In such a case, block 1704 presents the previous application interface in response to the first portion and then, responsive to block 1702 receiving the second portion of the gesture, presents a further-previous application interface associated with a further previously-interacted-with application, and so forth.

Figure 18:
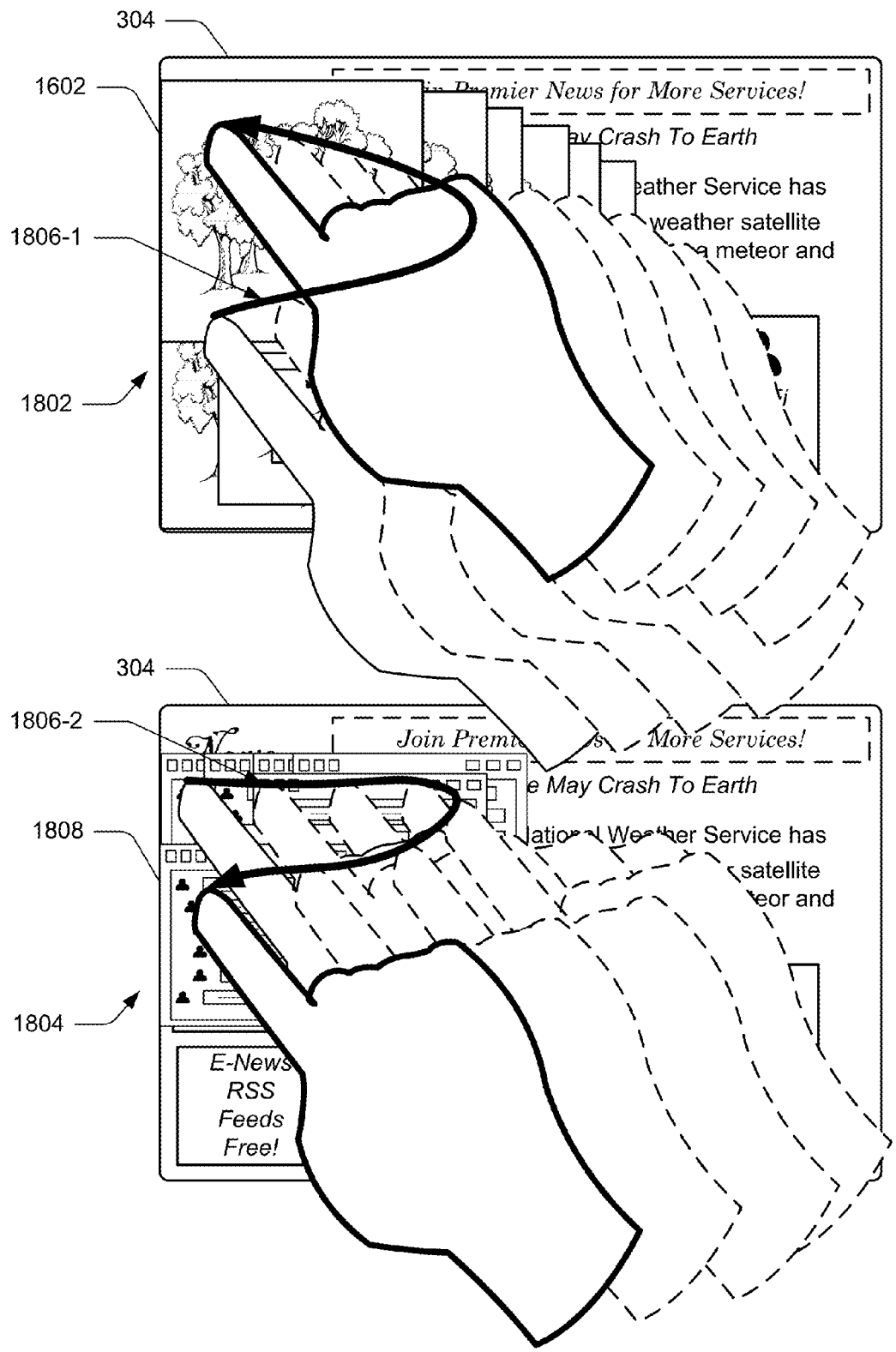
FIG. 18 illustrates the immersive interface of FIGS. 3 and 16, two progressive presentations, and two gesture portions.

This is illustrated in FIG. 18, which presents immersive interface 304 of FIG. 16 (shown twice for visual clarity), and ways in which block 1704 can respond to multiple gestures or portions of a single gesture. FIG. 18 illustrates two progressive presentations, 1802 and 1804, and gesture 1806 having two gesture portions 1806-1 and 1806-2, respectively. First progressive presentation 1802 illustrates a drag from a left edge of immersive interface 304 of thumbnail image 1602, and thus selection of the previously-interacted with photo application 1508. Note that thumbnail image 1602 "sticks" to gesture portion 1806-1. Note also that gesture 1806, unlike gesture 308 of FIGS. 3 and 16, returns to the left edge. In response, rather than gesture 308 ending and full-size application interface 1604 replacing webpage 306, gesture portion 1806-1 of gesture 1806 returns to the edge at which it began. In this case thumbnail image 1602 is progressively displayed with gesture portion 1806-1 but then disappears when gesture portion 1806-1 returns to the edge or another invalid gesture ending position.

Gesture 1806 continues with second portion 1806-2. In response, block 1704 presents second progressive presentation 1804, illustrating a second drag from the left edge of immersive interface 304. Here a social network thumbnail image 1808 of a further prior application, social-networking application 1510, is progressively presented. Gesture 1806 returns to the left edge as part of second portion 1806-2. In response, block 1704 drops off thumbnail image 1808 when gesture portion 1806-2 returns to the edge. This is but one example of ways in which the techniques enable users to select and view prior applications, even all of the previously-interacted-with applications, with only a single gesture. At any point in this example, gesture 1806 may end or indicate selection to present the full application interface for the selected application, at which time block 1704 presents the application interface (e.g., full-size application interface 1604 of FIG. 16 or a full application interface for the social-networking application).

The preceding discussion describes some methods in which the techniques may enable switching back to a previously-interacted-with application. Other methods describe ways in which the techniques enable and/or use edge gestures. Still other methods addressing thumbnail-image selection of applications are described below. These methods are shown as sets of blocks that specify operations performed but are not necessarily limited to the order shown for performing the operations by the respective blocks.

Figure 19:
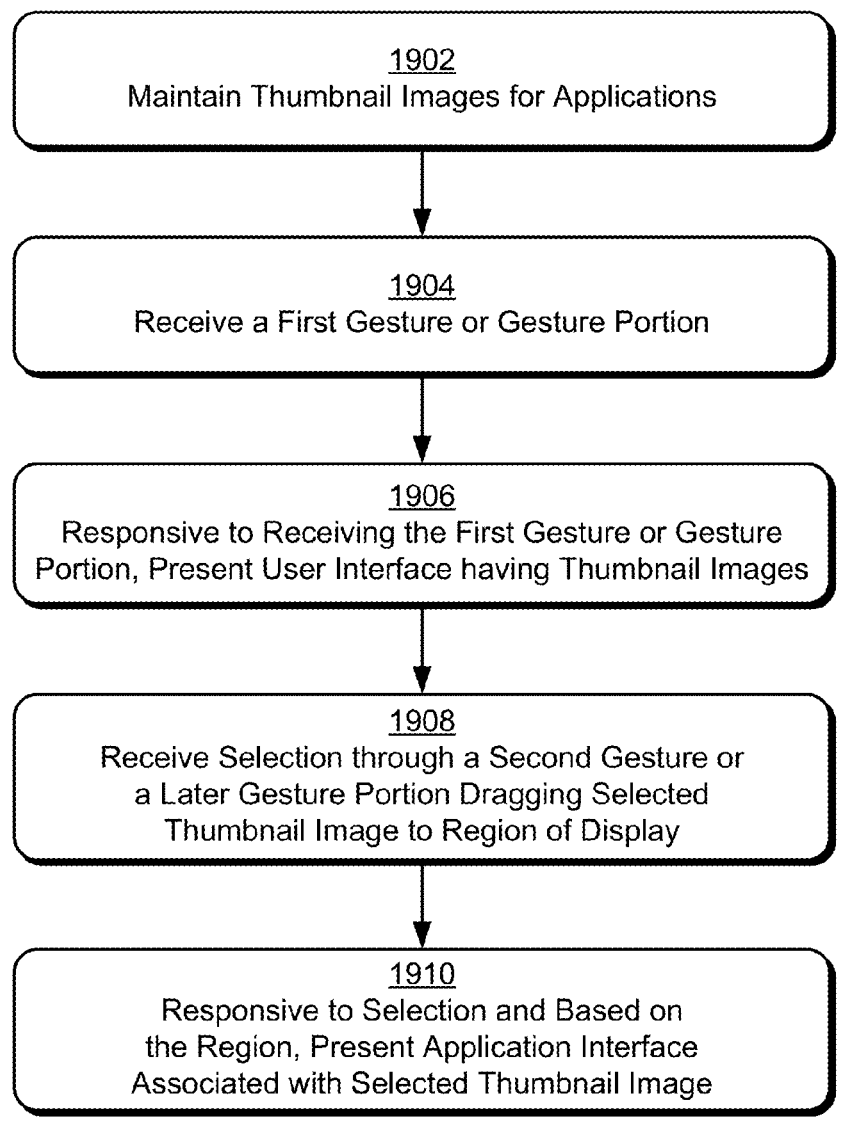
FIG. 19 illustrates a method enabling thumbnail-image selection of applications.

FIG. 19 depicts a method 1900 enabling thumbnail-image selection of applications. In portions of the following discussion reference may be made to system 100 of FIG. 1, methods 200, 800, 900, 1400, 1700, and example embodiments described above, reference to which is made for example only.

Block 1902 maintains thumbnail images for applications. These applications, as noted herein, may be previously-interacted-with, recently interacted with, set by a user or other entity for inclusion based on settings or user interest or popularity, whether or not they have been recently interacted with, and so forth. They may be arranged in various manners, such as the order set for applications in application queue 134 noted above, though this is not required. Further, a number of applications can vary based on screen real estate, such as three thumbnail images for a smartphone, six for a tablet, and twelve for a large-display laptop or desktop computer, to name just a few.

Assume, for example, that manager 130 maintains up to six thumbnail images 140 based on a size of screen real estate for table computer 106. Assume also that manager 130 maintains up to six applications in application group 136, the six applications selected as the last four applications that are most-recently interacted with but that are not currently on screen, and two applications based on often being commonly used by a user associated with tablet computer 106. Thus, manager 130 builds the applications of application group 136 with the first four having an order similar to that of application queue 134 of FIG. 1 as described elsewhere herein, and, following these four applications, two that are often used but are not currently on screen and are not of the first four.

Block 1904 receives a gesture or gesture portion selecting presentation of the thumbnails. These gestures or gesture portions can include one or more of the various gestures or gestures portions described elsewhere herein, such as a pointer tracking a movement received through various mouse devices (e.g., a touch pad, roller-ball mouse, track-ball mouse, pencil-tip mouse, traditional mouse) or a physical movement made with arm(s), finger(s), or a stylus received through a motion-sensitive or touch-sensitive mechanism.

This and prior or subsequent portions of a gesture may have, but are not required to have, a start point at an edge of a display, a later point not at the edge of the display, and a successive point at the edge of the display. Thus, a gesture having multiple portions in this case would look something like a multi-loop spiral, multiple circles, or a back-and-forth (e.g., zigzag) where each loop, circle, or back-and-forth starts, leaves, and returns to an edge of an application interface or display.

By way of example, consider a case where a gesture portion is part of an ongoing gesture that has a prior portion. Assume also that the prior portion selected one of applications 132, such as is shown in FIG. 16. In such a case, the portion of the gesture is received associated with selection of a prior application using an edge gesture starting at an edge of the current application interface and proceeding approximately perpendicularly away from the edge. In response, manager 130 presents a large thumbnail image for the previously-interacted-with application. This is shown with thumbnail image 1602 of FIG. 16.

The gesture portion received at block 1904, however, selects to cease presentation of the thumbnail image associated with the application, here thumbnail image 1602. In this example, the gesture portion returns toward the edge. In response, manager 130 ceases to present thumbnail image 1602 and determines that selection of a user interface having multiple selectable thumbnail images is intended.

Block 1906, responsive to receiving a first gesture or a gesture portion, presents a user interface on a display, the user interface having thumbnail images for applications, each of the thumbnail images a visual representation of an application interface for a respective one of the applications. Block 1906 may present the user interface in various manners, such as progressively from an edge of the display similar to as described for large thumbnail image 1602 above, though this is not required.

Figure 20:
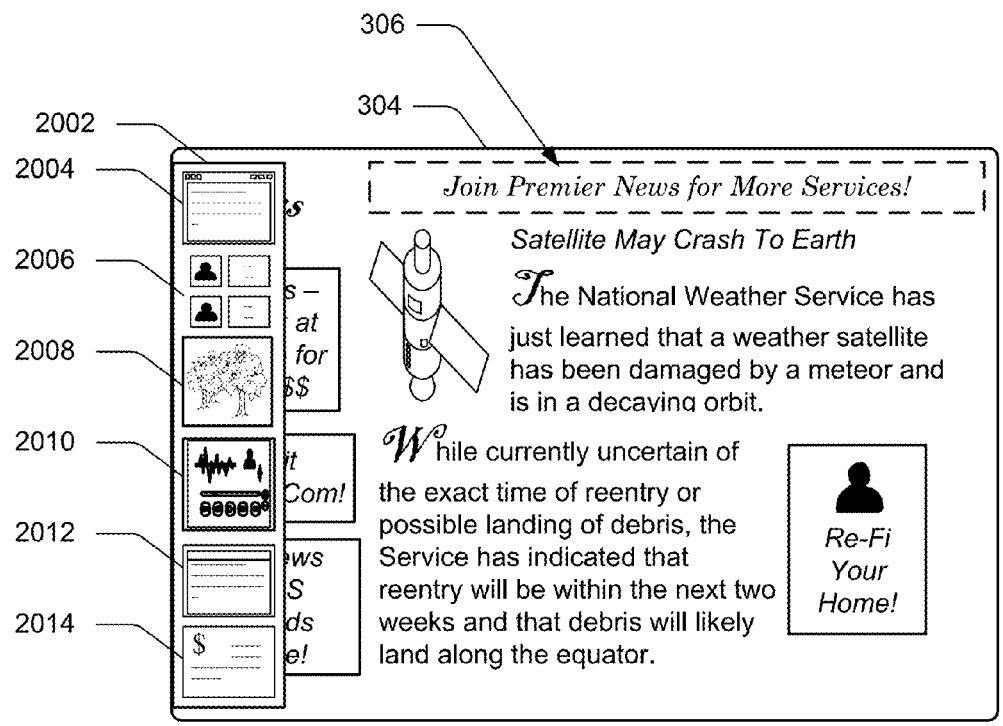
FIG. 20 illustrates a thumbnail-image-based application-selection user interface over the immersive interface and webpage of FIG. 3.
Figure 21:
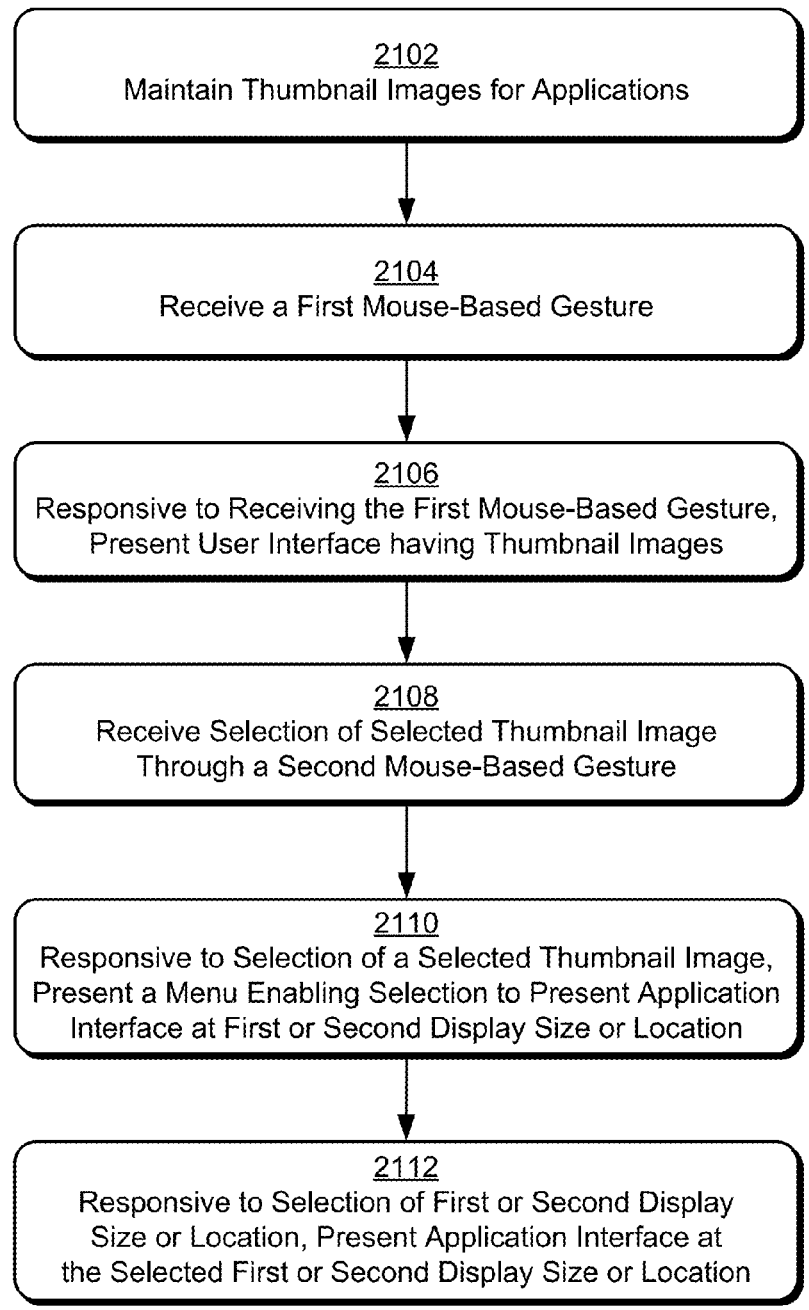
FIG. 21 illustrates a method enabling thumbnail-image selection of applications, the thumbnail images presented and selected through one or more mouse-based gestures.

Continuing the ongoing example, consider FIG. 20, which illustrates webpage 306 in immersive interface 304, over which a user interface 2002 is presented. User interface 2002 includes thumbnail images 2004, 2006, 2008, 2010, 2012, and 2014, one for each of applications 132 of application group 136.

Block 1908 receives selection of a selected thumbnail image of the thumbnail images and through a second gesture or a later gesture portion, the second gesture or later gesture portion dragging the selected thumbnail image from the user interface to a region of the display.

The region to which the thumbnail is dragged can vary and result in different effects. The regions may include edges of a display, such as some of those shown in FIG. 6, for example. The regions may also or instead include those represented by a window or an immersive environment, such as email interface 1004 and two immersive interfaces 1006 and 1008 of FIG. 10. Effects based on a region to which a thumbnail is dragged are described as part of block 1910 below.

Block 1910, responsive to receiving the selection and based on the region of the display to which the selected thumbnail image is dragged, presents the application interface associated with the selected thumbnail image effective to enable interaction with a selected application associated with the selected thumbnail image.

Block 1910 presents the application interface at a size and/or location based in part on the region. For example, responsive to receiving a drag of thumbnail 2008 of FIG. 20 to a center of immersive environment 304 of FIG. 20, application manager 130 replaces webpage 306 with a full-size application interface representing an expansion of thumbnail 2008.

By way of another example, responsive to receiving a drag of a thumbnail to an edge, application manager 130 may snap the application interface to that edge and at a size of whatever application is currently at the edge or based on a previously set size for that window or immersive area. An application interface is "snapped" to a location and/or size by being automatically presented at the size or location without requiring a user to manually move to the location and size the application interface and/or precisely locate or size the application interface. Thus, a user may move a thumbnail image to a region roughly at an edge of a display after which application manager 130 precisely locates the application interface at the edge and at the appropriate (larger) size. The snap can be shown gradually, such as with the thumbnail image moving from the user interface (if selected without being moved) to the location and/or the thumbnail image being gradually enlarged to the size of the application interface, though this is not required. Examples of some of the many ways that the techniques may present an application interface associated with a selected thumbnail are shown in FIGS. 10 and 16.

Block 1910 may replace a prior-presented application interface associated with a prior application with a selected application's interface, assuming another application interface is presented. Concluding the ongoing example, assume that a user drags thumbnail 2010 over some portion of immersive interface 304 and then ends the gesture by lifting off his or her finger from the display or clicking on a mouse button or tapping a touch pad. In response, application manager 130 removes webpage 306 and presents an application interface, similar to the result, but not the gesture received, of FIG. 16 shown at full-size application interface 1604.

Optionally, the techniques may alter application group 136 effective to alter the thumbnails that are or will be presented should the user interface again be selected. Thus, on selecting thumbnail 2010 in the example above, on selecting thumbnail images later, block 1906 may cease to present thumbnail 2010 and instead present a thumbnail representing webpage 306.

Method 1900 enables selection of thumbnail images as well as the user interface presenting them through gestures, which may be mouse-based or otherwise. Method 2100 enables selection with mouse-based gestures, at least in part. As noted above, mouse-based gestures can use various devices, such as a touch pad, roller-ball mouse, traditional mouse, and so forth. These mouse-based gestures present a mouse pointer or other selector visible on a display through which a user interacts with a device.

Block 2102 maintains thumbnail images for applications, such as in the various manners set forth for block 1902 above.

Block 2104 receives a first mouse-based gesture. This first mouse-based gesture may be one of many gestures set forth above. Optionally, the techniques may indicate, prior to receiving the first mouse-based gesture, that the user interface is selectable, the indication showing indicia for each of the thumbnail images at an edge of the display.

Figure 22:
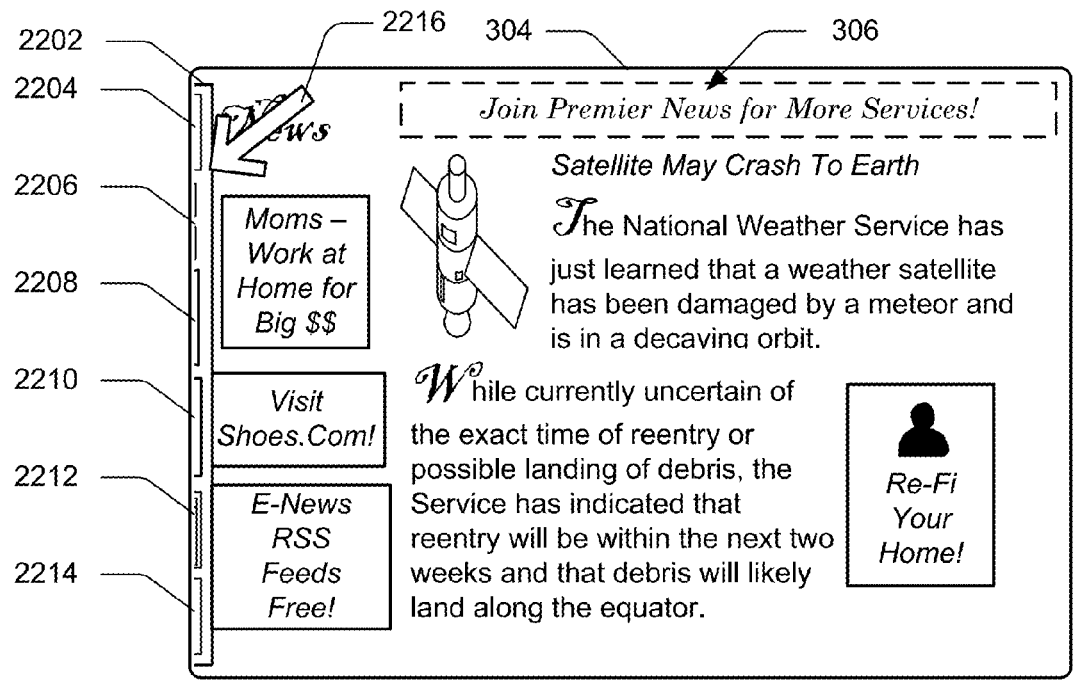
FIG. 22 illustrates an example menu enabling selection to present an application interface at multiple sizes and/or locations.
Figure 22:
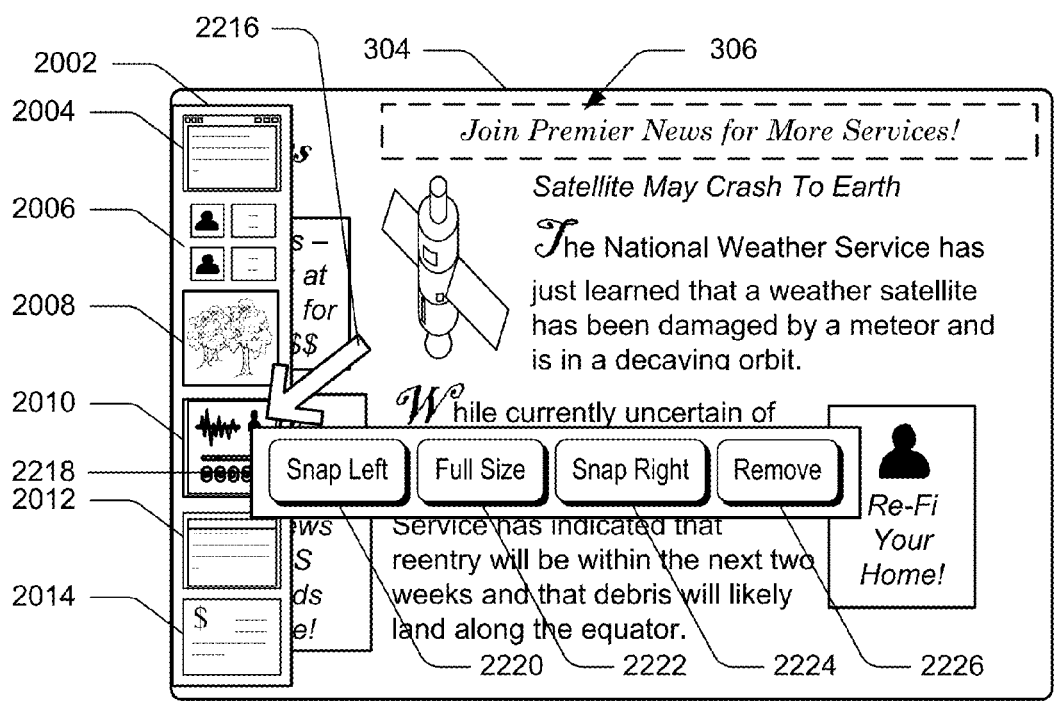

By way of example, consider FIG. 22, which illustrates immersive interface 304 having webpage 306, a user interface indicia 2202, and thumbnail indicia 2204, 2206, 2208, 2210, 2212, and 2214. These indicia may be useful to lead a user to decide whether or not presentation of a user interface having thumbnails is desired by the user. Presentation of the indicia may be responsive to a user action or otherwise. Thus, on moving a pointer to an edge of the display, the techniques may present the indicia. After a further action, such as moving the pointer from a top or bottom corner of that edge toward the indicia, the user interface is presented as described below. Assume that a gesture selecting the thumbnail is received, such as through a movement of a pointer 2216 toward the indicia or a selection at the edge in which the indicia are shown (e.g., a click of a mouse, tap on a touchpad, or hover with a pointer).

Block 2106, responsive to receiving a first mouse-based gesture, presents a user interface on a display, the user interface having thumbnail images for applications, each of the thumbnail images a visual representation of an application interface for a respective one of the applications. One example interface is shown at user interface 2002 in FIG. 22.

Block 2108 receives selection of a selected thumbnail image of the thumbnail images and through a second mouse-based gesture. Example selections include a selection and drag, through a mouse-based gesture, from the user interface to a region of the display, as described in method 1900. Other selections include a hover, tap, or mouse click on the thumbnail image. Continuing the above example, assume that a hover of pointer 2216 is received over thumbnail image 2010 of FIG. 20, as shown in FIG. 22.

Block 2110, responsive to selection of the selected thumbnail image, presenting a menu within, over, or adjacent to the user interface, the menu enabling selection to present the application interface associated with the selected thumbnail image at a first display size or location and a second display size or location. An example menu is shown in FIG. 22 at menu 2218. Menu 2218 enables selection of multiple sizes and/or locations at which an application interface can be presented, here with a snap left control 2220, a full size control 2222, a snap right control 2224, and a remove control 2226.

Note that selection of snap left control 2220 selects to present the application interface snapped automatically to the left side of the display, whether in an immersive or windows-based environment. An example in an immersive environment is shown at immersive interface 1006 in FIG. 13. Similarly, snap right control 2224 results in the application interface snapped to the right side of the display, such as shown at email interface 1004 in FIG. 13. Remove control 2226 removes the associated thumbnail (here thumbnail 2010) from the user interface (here user interface 2002).

Block 2112, responsive to selection of the first or second display size or location, presents the application interface associated with the selected thumbnail image and at the selected first or second display size or location within the display, the presentation effective to enable interaction with a selected application associated with the selected thumbnail image. Concluding the ongoing example, assume that a user selects full size control 2222 using pointer 2216 (not shown). In response, application manager 130 presents the application interface associated with the selected thumbnail 2010, here full-size application interface 1604, as shown in FIG. 16.

Figure 23:
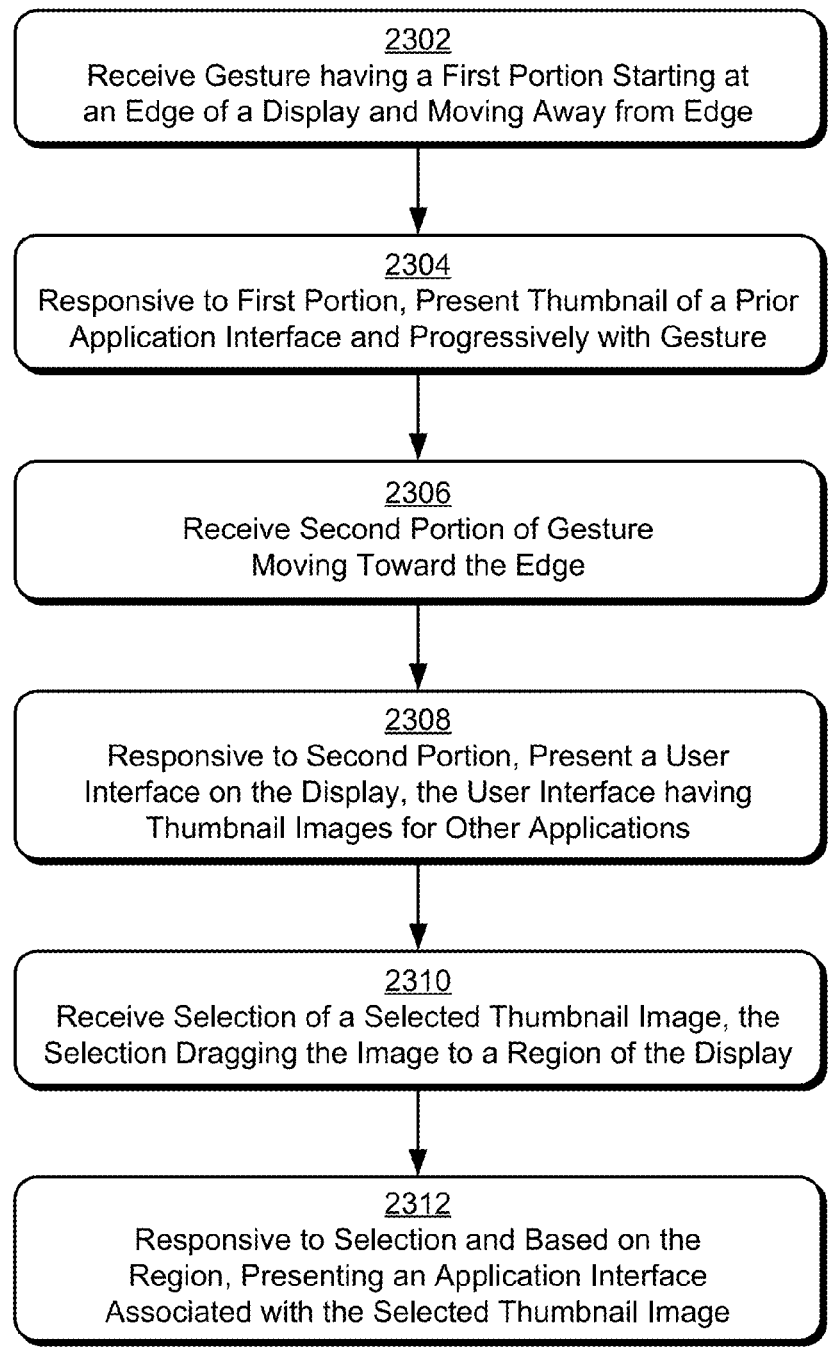
FIG. 23 illustrates a method enabling thumbnail-image selection of applications, the thumbnail images presented responsive to an edge gesture.

Methods 1900 and 2100 enables selection of thumbnail images as well as the user interface presenting them as noted above. FIG. 23 illustrates method 2300, which addresses a more-detailed example of selecting applications through thumbnail images using one or more edge gestures. Method 2300 may be used, in whole or in part, in conjunction with methods 1900 and/or 2100; method 2300 is not intended to limit the application of methods 1900 and 2100.

Block 2302 receives a gesture having a first portion starting at an edge of a display, moving away from the edge, and made over a current application interface associated with a current application without presenting a visible, selectable control over the current application interface or on the display presenting the current application interface.

Block 2304, responsive to receiving the first portion of the gesture, presents a thumbnail image of the previous application interface progressively with the first portion of the gesture as the gesture is received. Thereafter, block 2306 receives a second portion of the gesture that moves toward the edge.

Block 2308, responsive to receiving the second portion of the gesture, presents a user interface on the display, the user interface having other thumbnail images for other applications, each of the other thumbnail images a visual representation of an application interface for a respective one of the other applications.

Block 2310 receives selection of a selected thumbnail image of the other thumbnail images and through a third portion of the gesture or another gesture, the third portion of the gesture or the other gesture dragging the selected thumbnail image from the user interface to a region of the display.

Block 2312, responsive to receiving the selection and based on the region of the display to which the selected thumbnail image is dragged, presents the application interface associated with the selected thumbnail image, the presentation effective to enable interaction with a selected application associated with the selected other thumbnail image. Method 2300 may be performed in many of the various manners set forth above.

The preceding discussion describes some methods in which the techniques may enable thumbnail-image selection of applications. Other methods describe ways in which the techniques enable and/or use edge gestures and/or switch back to previously-interacted-with applications. Aspects of these methods may be implemented in hardware (e.g., fixed logic circuitry), firmware, a System-on-Chip (SoC), software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 24:
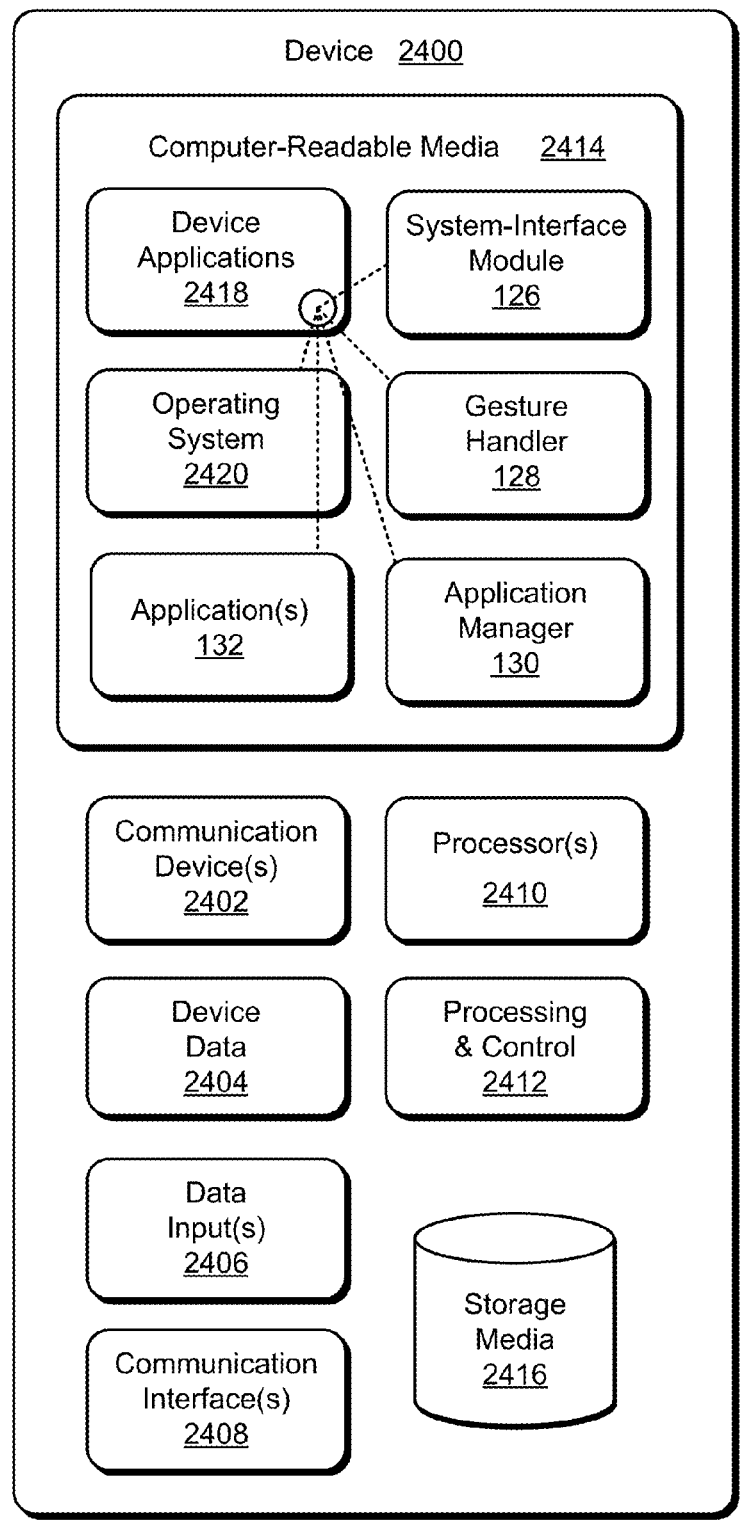
FIG. 24 illustrates an example device in which techniques for thumbnail-image selection of applications can be implemented.

FIG. 24 illustrates various components of example device 2400 that can be implemented as any type of client, server, and/or computing device as described with reference to the previous FIGS. 1-23 to implement techniques enabling edge gestures, switching back to a previously-interacted-with application, and/or thumbnail-image selection of applications. In embodiments, device 2400 can be implemented as one or a combination of a system-on-chip (SoC), wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 2400 may also be associated with a user (e.g., a person) and/or an entity that operates the device such that a device describes logical devices that include users, software, firmware, and/or a combination of devices.

Device 2400 includes communication devices 2402 that enable wired and/or wireless communication of device data 2404 (e.g., received data, data that is being received, data scheduled for broadcast, data packets of the data, etc.). The device data 2404 or other device content can include configuration settings of the device, media content stored on the device, and/or information associated with a user of the device. Media content stored on device 2400 can include any type of audio, video, and/or image data. Device 2400 includes one or more data inputs 2406 via which any type of data, media content, and/or inputs can be received, such as user-selectable inputs, messages, music, television media content, recorded video content, and any other type of audio, video, and/or image data received from any content and/or data source.

Device 2400 also includes communication interfaces 2408, which can be implemented as any one or more of a serial and/or parallel interface, a wireless interface, any type of network interface, a modem, and as any other type of communication interface. The communication interfaces 2408 provide a connection and/or communication links between device 2400 and a communication network by which other electronic, computing, and communication devices communicate data with device 2400.

Device 2400 includes one or more processors 2410 (e.g., any of microprocessors, controllers, and the like), which process various computer-executable instructions to control the operation of device 2400 and to enable techniques for thumbnail-image selection of applications. Alternatively or in addition, device 2400 can be implemented as a System-on-Chip (SoC) and/or with any one or combination of hardware, firmware, or fixed logic circuitry that is implemented in connection with processing and control circuits which are generally identified at 2412. Although not shown, device 2400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2400 also includes computer-readable storage media 2414, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2400 can also include a mass storage media device 2416.

Computer-readable storage media 2414 provides data storage mechanisms to store the device data 2404, as well as various device applications 2418 and any other types of information and/or data related to operational aspects of device 2400. For example, an operating system 2420 can be maintained as a computer application with the computer-readable storage media 2414 and executed on processors 2410. The device applications 2418 may include a device manager, such as any form of a control application, software application, signal-processing and control module, code that is native to a particular device, a hardware abstraction layer for a particular device, and so on.

The device applications 2418 also include any system components or modules to implement the techniques, such as device applications 2418 including system-interface module 126, gesture handler 128, application manager 130, and application(s) 132.

Conclusion

Although embodiments of techniques and apparatuses for thumbnail-image selection of applications have been described in language specific to features and/or methods, it is to be understood that the subject of the appended claims is not necessarily limited to the specific features or methods described. Rather, the specific features and methods are disclosed as example implementations enabling thumbnail-image selection of applications.

What is claimed is:

1. A computer-implemented method comprising:
receiving a first gesture or a gesture portion, at least a portion of the first gesture or gesture portion being over a first user interface associated with a first application;
analyzing the first gesture or gesture portion to determine whether to pass the first gesture or gesture portion to the first application, whether to display an application-selection user interface associated with a system-interface module, or whether to display a system-control user interface associated with the system-interface module, the analyzing based, at least in part, on a starting point and a second point of the first gesture or gesture portion;
responsive to determining to display the application-selection user interface, presenting, via the system-interface module, the application-selection user interface on a display, the application-selection user interface having thumbnail images for applications, each of the thumbnail images a visual representation of an application interface for a respective one of the applications, at least one thumbnail image being associated with a second application having a second user interface and at least one thumbnail image being associated with a third application having a third user interface, the second application and the third application being different, the system-interface module being associated with launching applications;
receiving a selection of one of the thumbnail images and through a second gesture or a later gesture portion;
responsive to receiving the selection, dragging the selected thumbnail image to a region of the display based, at least in part, on the second gesture or the later gesture portion; and
based on the region of the display to which the selected thumbnail image is dragged, presenting the application interface associated with the selected thumbnail image, the presenting effective to enable interaction with a selected application associated with the selected thumbnail image.

2. A computer-implemented method as described in claim 1, wherein the thumbnails are a smaller or lower-resolution image of the respective application interface as the respective application interface will appear responsive to selection of the thumbnail.

3. A computer-implemented method as described in claim 1, wherein the thumbnails are a smaller or lower-resolution image of the respective application interface as the respective application interface last appeared.

4. A computer-implemented method as described in claim 1, wherein one of the thumbnails includes a smaller or lower-resolution video of a video that will appear responsive to the selection of the one of the thumbnails.

5. A computer-implemented method as described in claim 1, wherein the region is an edge of the display and wherein presenting the application interface snaps the application interface to the edge.

6. A computer-implemented method as described in claim 5, wherein the presenting presents the application interface within an immersive environment and having a previously set size.

7. A computer-implemented method as described in claim 1, wherein the region is not at an edge of the display and wherein presenting the application interface presents the application on all or substantially all of the display.

8. A computer-implemented method as described in claim 1, wherein presenting the application-selection user interface progressively displays the application-selection user interface starting at an edge of the display.

9. A computer-implemented method as described in claim 8, wherein the first gesture or the gesture portion is an edge gesture received at the edge of the display from which application-selection user interface is progressively displayed.

10. A computer-implemented method as described in claim 1, wherein the gesture portion is part of an ongoing gesture, the ongoing gesture having a prior portion, the prior portion selecting one of the applications arranged in a queue, responsive to which a queued thumbnail image associated with the application in the queue is presented, and where the gesture portion selects to cease presentation of the thumbnail image associated with the application.

11. A computer-implemented method as described in claim 1, wherein the gesture portion is part of an ongoing gesture, the ongoing gesture having a first prior portion, the first prior portion having a start point at an edge of the display, a second prior portion having a later point not at the edge of the display, and the gesture portion following the second prior portion and having a successive point at the edge of the display.

12. A computer-implemented method as described in claim 1, wherein the first gesture and the second gesture or the gesture portion and the later gesture portion are received through a mouse or a touchpad.

13. A computer-implemented method as described in claim 1, further comprising, prior to presenting application-selection user interface, maintaining the thumbnail images for the applications based on the applications being previously interacted with, or commonly used or previously selected by a user associated with a device with which the display is associated.

14. A computer-implemented method as described in claim 1, wherein presenting the application interface associated with the selected thumbnail image replaces a previously-presented application interface associated with a prior application, and responsive to receiving a third gesture or another gesture portion, presenting a fourth user interface, the fourth user interface having a thumbnail image associated with the previously-presented application and the thumbnail images other than the selected thumbnail image.

15. A computer-implemented method comprising:
receiving a first touch-based gesture at least partially over a user interface associated with an immersive environment, the user interface associated with the immersive environment enabling interaction with one or more applications without controls provided through one or more window frames;
analyzing the touch-based gesture to determine whether to pass the first touch-based gesture to a first application associated with the user interface associated with the immersive environment, whether to display an application-selection user interface associated with a system-interface module, or whether to display a system-control user interface associated with the system-interface module based, at least in part, on a starting point and a second point of the first mouse-based gesture, the analyzing comprising analyzing the touch-based gesture to determine a final or intermediate length associated with the touch-based gesture, and an angle associated with the touch-based gesture;
responsive to determining to display the application-selection user interface, presenting the application-selection user interface associated with the system-interface module on a display, the application-selection user interface having thumbnail images for applications, each of the thumbnail images a visual representation of an application interface for a respective one of the applications, at least two of the applications having separate application interfaces, the system-interface module being associated with launching applications;
receiving selection of a selected thumbnail image of the thumbnail images and through a second touch-based gesture;
responsive to selection of the selected thumbnail image, presenting a menu within, over, or adjacent to the application-selection user interface associated with the system-interface module, the menu enabling selection to present the application interface associated with the selected thumbnail image at a first display size or location or a second display size or location; and
responsive to selection of the first or second display size or location, presenting the application interface associated with the selected thumbnail image and at the selected first or second display size or location within the display, the presenting effective to enable interaction with a selected application associated with the selected thumbnail image.

16. A computer-implemented method as described in claim 15, wherein the thumbnails are a smaller or lower-resolution image of the respective application interface as the respective application interface will appear responsive to selection of the thumbnail.

17. A computer-implemented method as described in claim 15, wherein the menu further enables selection to close the selected application or remove the selected thumbnail image from the application-selection user interface associated with the system-interface module.

18. A computer-implemented method as described in claim 15, further comprising, prior to receiving the first touch-based gesture, presenting an indication that the application-selection user interface associated with the system-interface module is selectable, the indication showing indicia for each of the thumbnail images at an edge of the display.

19. A computer-implemented method as described in claim 15, wherein the selected first or second display size or location is a size that is smaller than full size and presenting the application interface snaps the application interface to an edge of the display and within the immersive environment.

20. A system comprising: one or more computer processors; and one or more computer-readable storage media hardware having computer-readable instructions thereon that, responsive to execution by the one or more computer processors, perform operations comprising:
receiving a gesture having a first portion starting at an edge of a display, moving away from the edge, and made over a current application interface associated with a current application without presenting a visible, selectable control over the current application interface or on the display presenting the current application interface;
responsive to receiving the first portion of the gesture, presenting a thumbnail image of the previous application interface progressively with the first portion of the gesture as the gesture is received;
receiving a second portion of the gesture that moves toward the edge;
determining whether to display an application-selection interface associated with a system-interface module, whether to display a system-control user interface associated with the system-interface module, or to pass the gesture to the current application based, at least in part, on the first portion of the gesture and the second portion of the gesture, the determining comprising analyzing the first portion of the gesture and the second portion of the gesture to determine an angle associated with the gesture, and a speed associated with the gesture;

responsive determining to display the application-selection interface associated with the system-interface module, presenting, via the system-interface module, the application-selection user interface associated with the system-interface module on the display, the application-selection user interface associated with the system-interface module having comprising other thumbnail images for other applications, each of the other thumbnail images a visual representation of an application interface for a respective one of the other applications;

receiving selection of one of the thumbnail images and through a third portion of the gesture or another gesture, the third portion of the gesture or the other gesture dragging the selected thumbnail image from the system-interface application user interface to a region of the display; and responsive to receiving the selection and based on the region of the display to which the selected thumbnail image is dragged, presenting the application interface associated with the selected thumbnail image, the presenting effective to enable interaction with a selected application associated with the selected other thumbnail image.

\* \* \* \* \*